US009440854B2

(12) United States Patent
MacLachlan et al.

(10) Patent No.: US 9,440,854 B2
(45) Date of Patent: Sep. 13, 2016

(54) CHIRAL OR ACHIRAL, MESOPOROUS CARBON

(75) Inventors: Mark John MacLachlan, Vancouver (CA); Kevin Eric Shopsowitz, Boston, MA (US); Wadood Yasser Hamad, Vancouver (CA)

(73) Assignee: FPINNOVATIONS, Pointe-Claire, Quebec (CA)

( * ) Notice: Subject to any disclaimer, the term of this patent is extended or adjusted under 35 U.S.C. 154(b) by 462 days.

(21) Appl. No.: 14/115,659

(22) PCT Filed: May 10, 2012

(86) PCT No.: PCT/CA2012/000450
§ 371 (c)(1),
(2), (4) Date: Feb. 7, 2014

(87) PCT Pub. No.: WO2012/151682
PCT Pub. Date: Nov. 15, 2012

(65) Prior Publication Data
US 2014/0295161 A1 Oct. 2, 2014

Related U.S. Application Data

(60) Provisional application No. 61/484,756, filed on May 11, 2011.

(51) Int. Cl.
C01B 31/02 (2006.01)
C09K 19/02 (2006.01)
C09K 19/38 (2006.01)
C04B 35/532 (2006.01)
C04B 38/00 (2006.01)

(52) U.S. Cl.
CPC ............. *C01B 31/02* (2013.01); *C04B 35/532* (2013.01); *C04B 38/0022* (2013.01); *C09K 19/02* (2013.01); *C09K 19/3819* (2013.01); *C04B 2235/3418* (2013.01); *C04B 2235/48* (2013.01)

(58) Field of Classification Search
CPC .................................................... C01B 31/02
See application file for complete search history.

(56) References Cited

U.S. PATENT DOCUMENTS

| 3,639,266 | A | 2/1972 | Battista |
| 5,108,725 | A | 4/1992 | Beck |
| 8,623,237 | B2 | 1/2014 | MacLachlan |
| 2005/0036935 | A1 | 2/2005 | Pak et al. |

FOREIGN PATENT DOCUMENTS

| JP | 2003206112 | 7/2003 |
| JP | 2004115354 | 4/2004 |
| JP | 2004244311 | 9/2004 |
| WO | 9111390 | 8/1991 |
| WO | 2011123929 | 10/2011 |

OTHER PUBLICATIONS

English language translation of JP 2004244311.
English language translation of JP 2004115354.
English language translation of JP 2003206112.
Liang, C., Li, Z., Dai, S. Mesoporous carbon materials: synthesis and modification. Angew. Chem. Int. Ed. 47, 3696-3717 (2008).
Bansal, R. C., Donnet, J. B., Stoeckli, F. Active Carbon, Marcel Dekker, New York (1988) pp. 119-333.
Han, S.J., Sohn, K., & Hyeon, T. Fabrication of new nanoporous carbons through silica templates and their application to the adsorption of bulky dyes. Chem. Mater. 12, 3337-3341 (2000).
Lee, J., Yoon, S., Hyeon, T., Oh, S.M., & Kim, K.B. Synthesis of a new mesoporous carbon and its application to electrochemical double-layer capacitors. Chem. Commun. 2177-2178 (1999).
Ji, X. Herle, S. Rho, Y., & Nazar, L.F. Carbon/MoO2 composite based on porous semi-graphitized nanorod assemblies from in situ reaction of tri-block polymers. Chem. Mater. 19, 374-383 (2007).
Fernandez, J.A., Morishita, T., Toyoda, M., Inasaki, M., Stoeckli, F., & Centeno, T.A. Performance of mesoporous carbons derived from poly(vinyl alcohol) in electrochemical capacitors. J. Pow. Sour. 175, 675-679 (2008).
Kanatzidis, M. G. Beyond silica: nonoxidic mesostructured materials. Adv. Mater. 19, 1165-1181 (2007).
Kresge, C.T., Leonowicz, M.E., Roth, W.J., Vartuli, J.C. & Beck, J.S. Ordered mesoporous molecular sieves synthesized by a liquid-crystal template mechanism. Nature 359, 710-712 (1992).
Yang, P., Zhao, D., Margolese, D.I., Chmelka, B.F. & Stucky, G.D. Generalized syntheses of large-pore meosporous metal oxides with nanocrystalline walls. Nature 396, 152-154 (1998).

(Continued)

*Primary Examiner* — Stuart Hendrickson
(74) *Attorney, Agent, or Firm* — Norton Rose Fulbright Canada LLP

(57) ABSTRACT

A composition and a method for producing mesoporous carbon materials with a chiral or achiral organization. In the method, a polymerizable inorganic monomer is reacted in the presence of nanocrystalline cellulose to give a material of inorganic solid with cellulose nanocrystallites organized in a chiral nematic organization. The cellulose can be carbonized through thermal treatment under inert atmosphere (e.g., nitrogen or argon) and the silica may subsequently be removed using aqueous solutions of sodium hydroxide (NaOH) or hydrogen fluoride (HF) to give the stable mesoporous carbon materials that retain the chiral nematic structure of the cellulose. These materials may be obtained as free-standing films with very high surface area. Through control of the reaction conditions the pore-size distribution may be varied from predominantly microporous to predominantly mesoporous materials. These are the first materials to use cellulose as both the structural template and carbon source for a mesoporous carbon material. These are also the first carbon materials to combine mesoporosity with long-range chiral ordering. Possible applications for these materials include: charge storage devices (e.g. supercapacitors and anodes for Li-ion batteries), adsorbents, gas purifiers, light-weight nanocomposite materials, catalyst supports (e.g., for chiral transformations), gas storage, and as a hard-template to generate other materials, preferably with chiral structures.

14 Claims, 16 Drawing Sheets

(56) References Cited

OTHER PUBLICATIONS

Armatas, G.A. & Kanatzidis, M.G. Hexagonal mesoporous germanium. Science 313, 817-820 (2006).

MacLachlan, M.J., Coombs, N. & Ozin, G.A. Non-aqueous supramolecular assembly of metal germanium sulfide mesostructures from [Ge4S10]4—clusters. Nature 397, 681-684 (1999).

Inagaki, S., Guan, S., Ohsuna, T., Terasaki, O. An ordered mesoporous organosilica hybrid material with a crystal-like wall structure. Nature 416, 304-307 (2002).

Sun, D., Riley, A.E., Cadby, A.J., Richman, E.K., Korlann, S.D. & Tolbert, S.H. Hexagonal nanoporous germanium through surfactant-driven self-assembly of Zintl clusters. Nature 441, 1126-1130 (2006).

Attard, G.S., Glyde, J.C. & Goltner, C.G. Liquid-crystalline phases as templates for the synthesis of mesoporous silica. Nature 378, 366-368 (1995).

Ryoo, R., Joo, S.H., & Jun, S. Synthesis of highly ordered carbon molecular sieves via template-mediated structural transformation. J. Phys. Chem. B 103, 7743-7746 (1999).

Jun, S., Joo, S.H., Ryoo, R., Kruk, M., Jaroniec, M., Liu, Z., Ohsuna, T., & Terasaki, O. Synthesis of new, nanoporous carbon with hexagonally ordered mesostructure. J. Am. Chem. Soc. 122, 10712-10713 (2000).

Kaneda, M., Tsubakiyama, T., Carlsson, A., Sakamoto, Y., Ohsuna, T., Terasaki, O., Joo, S.H., & Ryoo, R. Structural study of mesoporous MCM-48 and carbon networks synthesized in the spaces of MCM-48 by electron crystallography. J. Phys. Chem. B 106, 1256-1266 (2002).

Vix-Guterl, C., Boulard, S., Parmentier, J., Werckmann, J., & Patarin, J. Formation of ordered mesoporous carbon material from a silica template by a one-step chemical vapour infiltration process. Chem. Lett. 1062-1063 (2002).

Mukherjee, S.M. & Woods, H.J. X-ray and electron microscope studies of the degradation of cellulose by sulphuric acid. Biochim. Biophys. Acta 10, 499-511 (1953).

Revol, J.F., Bradford, H., Giasson, J., Marchessault, R.H. & Gray, D.G. Helicoidal self-ordering of cellulose microfibrils in aqueous suspension. Int. J. Biol. Macromol. 14, 170-172 (1992).

Revol, J.F., Godbout, L. & Gray, D.G. Solid self-assembled films of cellulose with chiral nematic order and optically variable properties. J. Pulp Pap. Sci. 24, 146-149 (1998).

Broer, D.J., Lub, J. & Mol, G.N. Wide-band reflective polarizers from cholesteric polymer networks with a pitch gradient. Nature 378, 467-469 (1995).

Yang, D.-K., West, J.L., Chien, L.-C. & Doane, J.W. Control of reflectivity and bistability in displays using cholesteric liquid crystals. J. Appl. Phys. 76, 1331-1333 (1994).

Kopp, V.I., Fan, B., Vithana, H.K.M. & Genack, A.Z. Low-threshold lasing at the edge of a photonic stop band in cholesteric liquid crystals. Opt. Lett. 23, 1707-1709 (1998).

Shopsowitz, K. E., Qi, H., Hamad, W. Y. & MacLachlan, M. J. Free-Standing Mesoporous Silica Films with Tunable Chiral Nematic Structures. Nature 468, 422-425 (2010).

Ishida, O., Kim, D.Y., Kuga, S., Nishiyama, Y., & Brown, R.M. Microfibrillar carbon from native cellulose. Cellulose 11, 475-480 (2004).

Essig, M., Richards, G.N., & Schenck, E. Mechanism of formation of the major volatile products from the pyrolysis of cellulose. Cellulose and Wood—Chemistry and Technology. Wiley Interscience, New York, 841-862 (1989).

Kim, D.Y., Nishiyama, Y., Wada, M., & Kuga, S. High-yield carbonization of cellulose by sulfuric acid impregnation. Cellulose 8, 29-33 (2001).

Shopsowitz et al. "Chiral Nematic Mesoporous Carbon Derived From Nanocrystalline Cellulose", Angew. Chem. Int. Ed. 2011, 50, 10991-10995. published online Sep. 23, 2011.

CHIRAL OR ACHIRAL, MESOPOROUS CARBON

CROSS-REFERENCE TO RELATED APPLICATION

This application is a National Phase entry of PCT/CA2012/000450 filed May 10, 2012, in which the United States of America was designated and elected, and which remains pending in the International phase until Nov. 11, 2013, which application in turn claims priority under 35 USC 119(e) from U.S. Provisional application Ser. No. 61/484,756 filed May 11, 2011. This application is related to U.S. patent application Ser. No. 13/076,469 filed Mar. 31, 2011, published as US 2011-0248214 on Oct. 13, 2011 and the contents thereof are incorporated herein by reference.

TECHNICAL FIELD

This invention relates to a mesoporous carbon and a process for its preparation.

In particular the present invention relates to a new material made predominantly of carbon and having both a mesoporous structure and long-range ordering (chiral nematic or nematic) that arises from the ordering of a nanocrystalline cellulose (NCC) template.

BACKGROUND ART

Porous carbon materials are extensively used in many modern applications due to their wide availability and excellent physical and chemical properties.[1] Some important examples include uses as catalyst supports, adsorbents for separation and gas storage, and in energy storage devices (e.g., batteries). The majority of commercially available porous carbons are microporous (pores<2 nm) and are typically produced by the pyrolysis of organic precursors such as coal, wood, or polymers, followed by a physical or chemical activation step.[2] These materials have been used commercially for many years and may be produced in bulk quantities at low cost. Several key drawbacks, however, have been identified for conventional microporous carbons, principally: (i) broad pore-size distributions, (ii) slow mass transport of molecules due to the small pore sizes, (iii) low conductivity due to functionalization incurred during activation, and (iv) collapse of the porous structure during high-temperature treatments.[1] Recent development of new nanostructured carbon materials has the potential to address some of these issues and provide new opportunities for applications. In particular the incorporation of larger pores into carbonaceous materials can be advantageous for a range of applications including the adsorption of large molecules, chromatography, electrochemical double-layer capacitors, and lithium ion batteries.[3-5]

Template-synthesis of inorganic solids using the self-assembly of lyotropic liquid crystals offers access to materials with well-defined porous structures.[7-16] Since it was described in 1992 by Beck et al., liquid crystal templating has become a very important method to developing periodic materials with organization in the 1-100 nm dimension range. Mesoporous solids are typically formed from condensing an inorganic precursor (e.g., tetraethoxysilane) in the presence of a liquid crystalline template followed by the removal of the template. Although ionic surfactants were used in the original invention, diverse molecular (e.g., non-ionic surfactants) and polymeric substances have been used as templates. The materials obtained typically have periodic pores in the mesopore range of 2-50 nm in diameter that may be organized into hexagonal, cubic, or other periodic structures.

In 1999 it was reported that mesoporous silica could act as a hard-template for mesoporous carbon,[17] thus providing the first example of a highly ordered mesoporous carbon material. Hard-templating of carbon typically involves the impregnation of a mesoporous "hard-template" with a suitable carbon source and acid catalyst followed by carbonization and selective removal of the template.

FIG. 1 shows a scheme illustrating the way that carbon materials have been previously prepared using hard-templating. In the first step, a surfactant (molecule or polymer) assembles into a liquid crystalline phase (step a), and a silica precursor (and often a catalyst) is added in step b to give a mesostructured silica-surfactant composite, which is isolated. The sacrificial template is then removed by pyrolysis or solvent extraction (step c), to give a mesoporous silica host. Subsequently, the mesoporous silica host is impregnated with a carbon source (e.g., sugar) as shown in step d then pyrolyzed under inert atmosphere as shown in step e to give a mesoporous silica host that is partially loaded with carbon. Besides the high number of steps needed in this route, one of the drawbacks is the difficulty in fully loading the mesoporous host. Consequently, steps d and e are often repeated several times. Once the material is sufficiently loaded (as shown in step f), the silica host is removed with a procedure known to dissolve silica, often using aqueous or alcoholic hydroxide salts (e.g., NaOH, KOH, $NH_4OH$) or hydrogen fluoride (HF) (step g) to give the mesoporous carbon.

In this case the hard-template essentially acts as a mould whose pore structure remains unchanged during the impregnation and carbonization steps. The hard-templates that have been explored are most commonly block-copolymer or surfactant templated periodic mesoporous silicas, such as SBA-15 and MCM-48. Using the approach shown in FIG. 1 and described above, numerous mesoporous carbon materials have been synthesized with various ordered pore structures (e.g., hexagonal and cubic).[18-20] Several limitations to this approach exist including (i) the sacrificial use of expensive block-copolymers or surfactants, (ii) the necessity for multiple loading steps, and (iii) the difficulty of synthesizing films and monoliths.[1]

Cellulose is the major constituent of wood and plant cell walls and is the most abundant biomaterial on the planet. Cellulose is therefore an extremely important resource for the development of sustainable technologies. The rigid polymeric structure of native cellulose gives rise to excellent mechanical properties but has prevented its use for the hard-templating synthesis of mesoporous carbons as described above. Despite this, the synthesis of mesoporous carbon directly from cellulose could provide a cheap, renewable route to carbon materials. In nature, cellulose exists as the main constituent in the cell wall material of plant and wood fibres which may be regarded as concentric composite tubes whose diameters are on the order of several microns. Stable suspensions of cellulose nanocrystals can be obtained through sulfuric acid hydrolysis of bulk cellulosic material.[21] In water, suspensions of nanocrystalline cellulose (NCC) organize into a chiral nematic phase that can be preserved upon air-drying resulting in chiral nematic films.[22,23] The high-surface area, unique structural, and self-assembly properties of NCC make it a very interesting potential template for porous materials.

The chiral nematic (or cholesteric) liquid crystalline phase, where mesogens organize into a helical assembly, was first observed for cholesteryl derivatives but is now known to exist for a variety of molecules and polymers. The helical organization of a chiral nematic liquid crystal (LC) results in iridescence when the helical pitch is on the order of the wavelength of visible light due to the angle-dependent selective reflection of circularly polarized light. For this reason, chiral nematic LCs have been extensively studied for their photonic properties and used for applications such as in polarizing mirrors, reflective displays, and lasers.[24-26] Incorporation of chiral nematic organization into solid-state structures could provide materials with novel properties. We have recently reported that this may be achieved by using NCC as a lyotropic chiral nematic template.[27,28] Various silica precursors may be added to aqueous suspensions of NCC without disrupting the chiral nematic phase and, following slow evaporation, NCC-silica composite films are obtained. We have shown that by removing the NCC, these composite films can be used to produce chiral nematic mesoporous silica that reflects circularly polarized light. Furthermore, the NCC-containing composite films have the potential to be converted to chiral nematic mesoporous carbon by directly using cellulose as the carbon source. This would provide a simple procedure for producing mesoporous carbon from cellulose that could be used for the applications mentioned above. The chirality of these materials could also result in novel properties that have previously not been associated with mesoporous carbon materials.

DISCLOSURE OF THE INVENTION

This invention seeks to provide a process for producing a mesoporous carbon material.

This invention also seeks to provide a mesoporous carbon material.

In one aspect of the invention there is provided a process for producing a mesoporous carbon material comprising:
i) carbonising nanocrystalline cellulose (NCC) in an inorganic matrix, and
ii) removing the inorganic matrix from the carbonised NCC.

In another aspect of the invention there is provided a mesoporous carbon having a chiral nematic organization.

In still another aspect of the invention there is provided a mesoporous carbon wherein the carbon is a carbonized cellulose, especially a pyrolysed NCC.

DETAILED DESCRIPTION OF THE INVENTION

Figure 1:
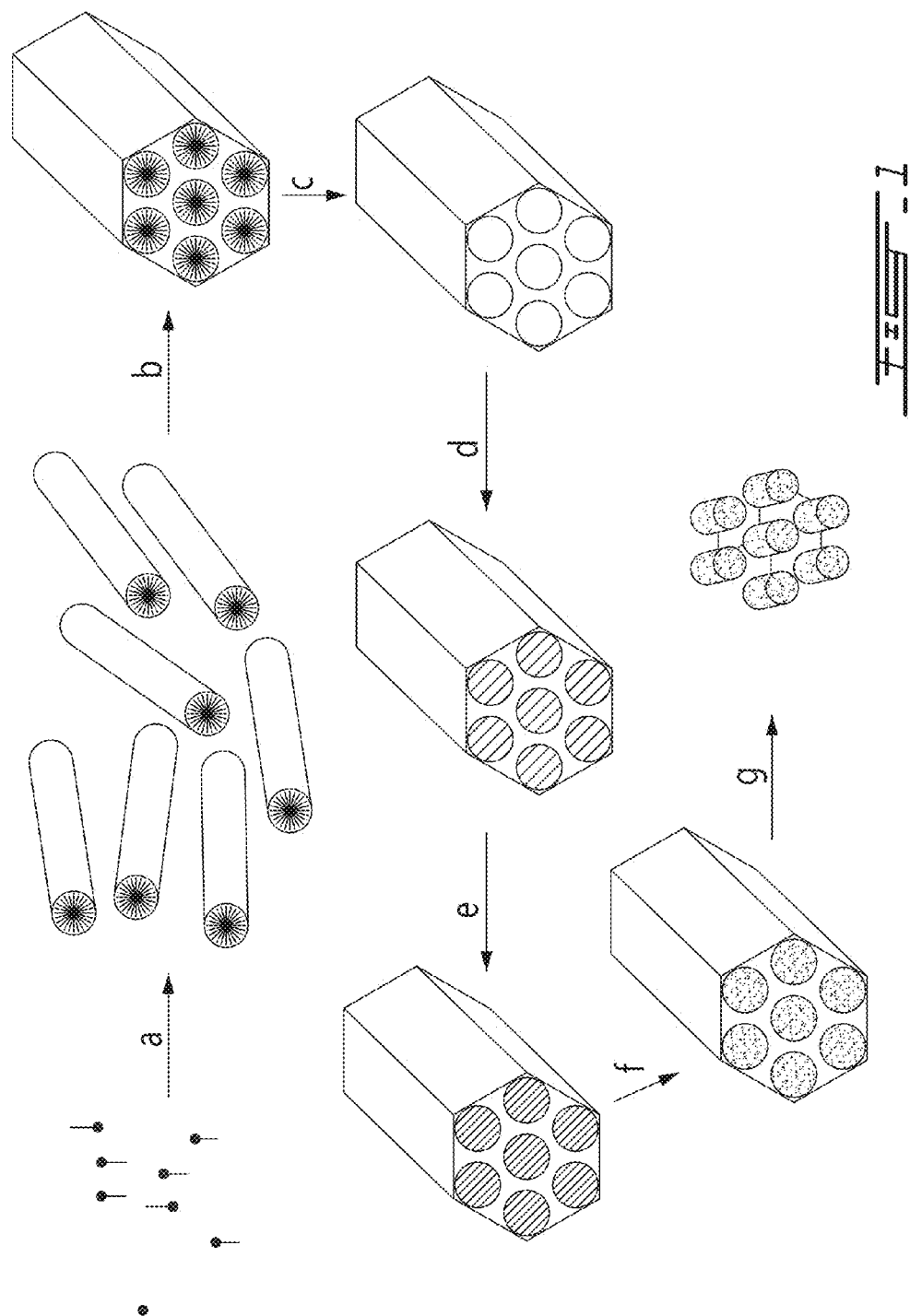
FIG. 1: Schematic illustrating a prior art method for making mesoporous carbon using a mesoporous silica template.

This invention provides a method for preparing mesoporous carbonaceous materials, especially chiral, mesoporous carbonaceous materials. The method is substantially simpler than the methods previously used for hard-templating mesoporous carbon, and incorporates new properties in the resulting carbon-based material (chirality and the ability to form free-standing films), in which said properties may be useful for a variety of applications. The free-standing films of mesoporous carbon produced by the method of the invention typically have a surface area greater than 1000 $m^2/g$ which is markedly higher than prior films of mesoporous carbon produced by other methods (usually 600-800 $m^2/g$).

In one embodiment the new method produces mesoporous carbon materials that have chiral nematic structure. This method takes advantage of the high surface area and self-assembly properties of nanocrystalline cellulose (NCC) as well as its utility as a carbon precursor. When a suitable precursor to silica (e.g., tetraethoxysilane, TEOS, or tetramethoxysilane, TMOS) is hydrolyzed in the presence of NCC a film is obtained after drying in which the NCC suspension has self-assembled into a chiral nematic structure. The films obtained are composite structures of cellulose nanocrystals embedded in a silica matrix. Upon pyrolysis under inert atmosphere (which can be any gas that does not promote oxidation of the carbon, including nitrogen, helium, neon, argon, and other commonly used inert gases, or under vacuum) to convert the NCC template to carbon at an elevated temperature, suitably 500° C. to 2000° C., especially 500° C. to 1000° C., and typically at 900° C. under nitrogen; and subsequent removal of the silica matrix, typically using NaOH or a similar strong base (e.g., KOH, $NH_4OH$) in water, alcohol (e.g., methanol, ethanol), or a mixture thereof, although HF may also be employed, a mesoporous carbon material is obtained as a powder or as a film, depending on the morphology of the starting composite. Typically the removal of the silica matrix may be by heating in an aqueous alkali, for example sodium hydroxide, at a temperature of 20° C. to 100° C., especially 70° C. to 100° C.

Any process for removing the matrix may be employed provided it does not deleteriously affect the remaining carbonized NCC which is the desired end product.

Nitrogen adsorption measurements indicate that the carbon materials are mesoporous and have large surface areas. These new mesoporous carbon materials have chiral nematic structures that may be directly observed by electron microscopy. These novel materials are attractive for many practical applications, including catalyst supports (for chiral or achiral transformations), supercapacitors, batteries, fuel cells, adsorbents, lightweight reinforcement materials, components of composites, and as templates for other chiral nanomaterials.

In a particular embodiment of this invention, a silica precursor is polymerized in the presence of NCC to create materials with cellulose nanocrystallites organized in the silica matrix. After pyrolysis of the cellulose at elevated temperature under inert atmosphere and removal of the silica, a mesoporous carbon material is obtained.

Figure 2:
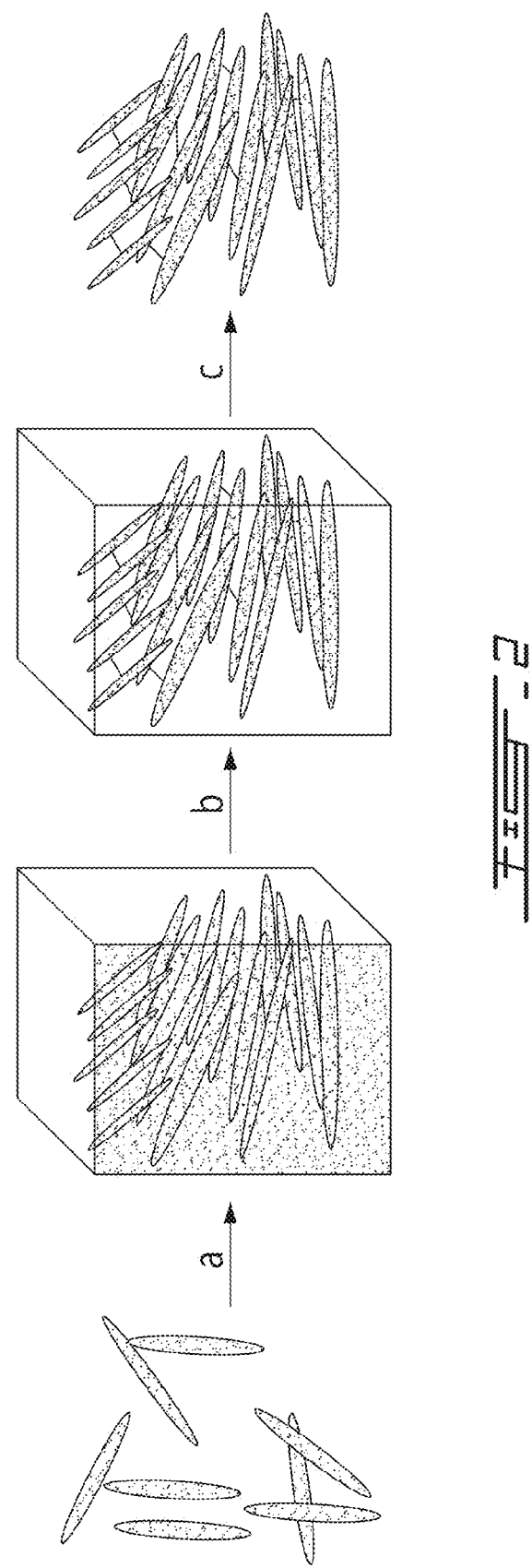
FIG. 2: Schematic illustrating the method of the invention for making mesoporous carbon using nanocrystalline cellulose as a template.

FIG. 2 shows the schematic route to the preparation of the chiral, mesoporous carbon materials. In step (a), a silica precursor is hydrolyzed in a solution of NCC and the mixture is slowly dried, giving an NCC-silica composite material with chiral nematic order. In step (b), the composite material is pyrolyzed under inert atmosphere to give a carbon/silica composite material. Finally, in step (c), the silica is removed (e.g., using aqueous or alcoholic NaOH or another strong base) to give mesoporous carbon with chiral nematic order.

Figure 3:
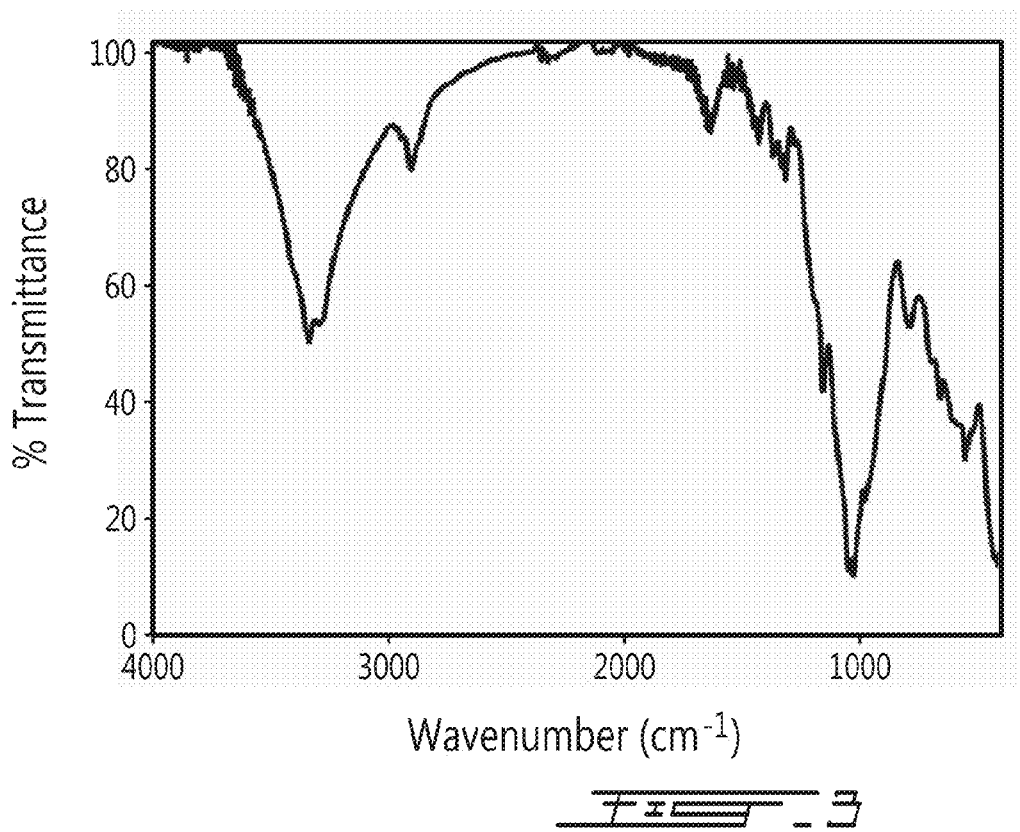
FIG. 3: IR spectrum of NCC-silica composite sample from preparation 2.
Figure 4:
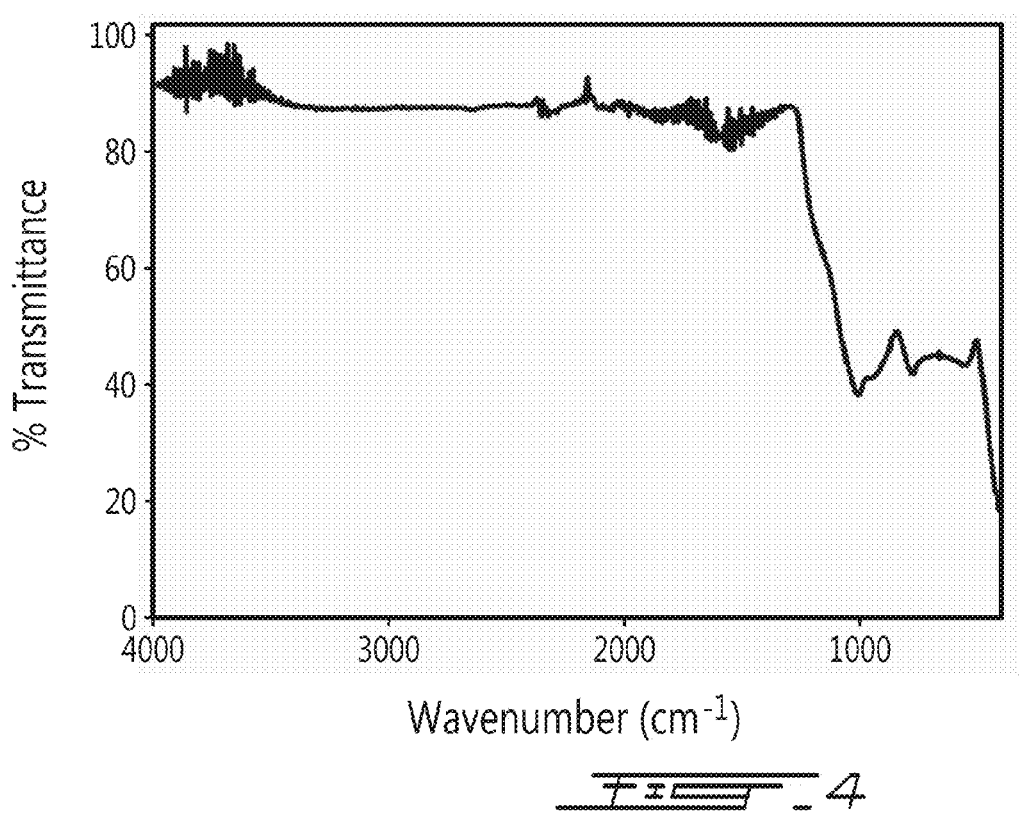
FIG. 4: IR spectrum of carbon-silica composite sample from preparation 2.
Figure 5:
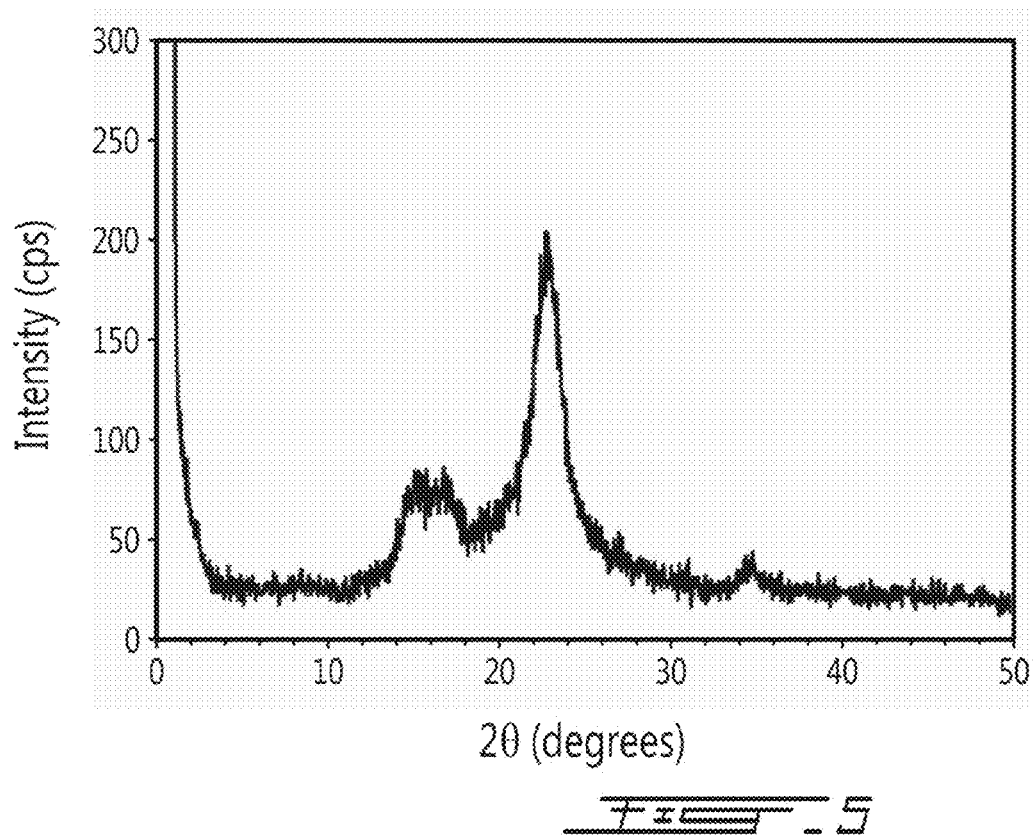
FIG. 5: PXRD of NCC-silica composite sample from preparation 2.
Figure 6:
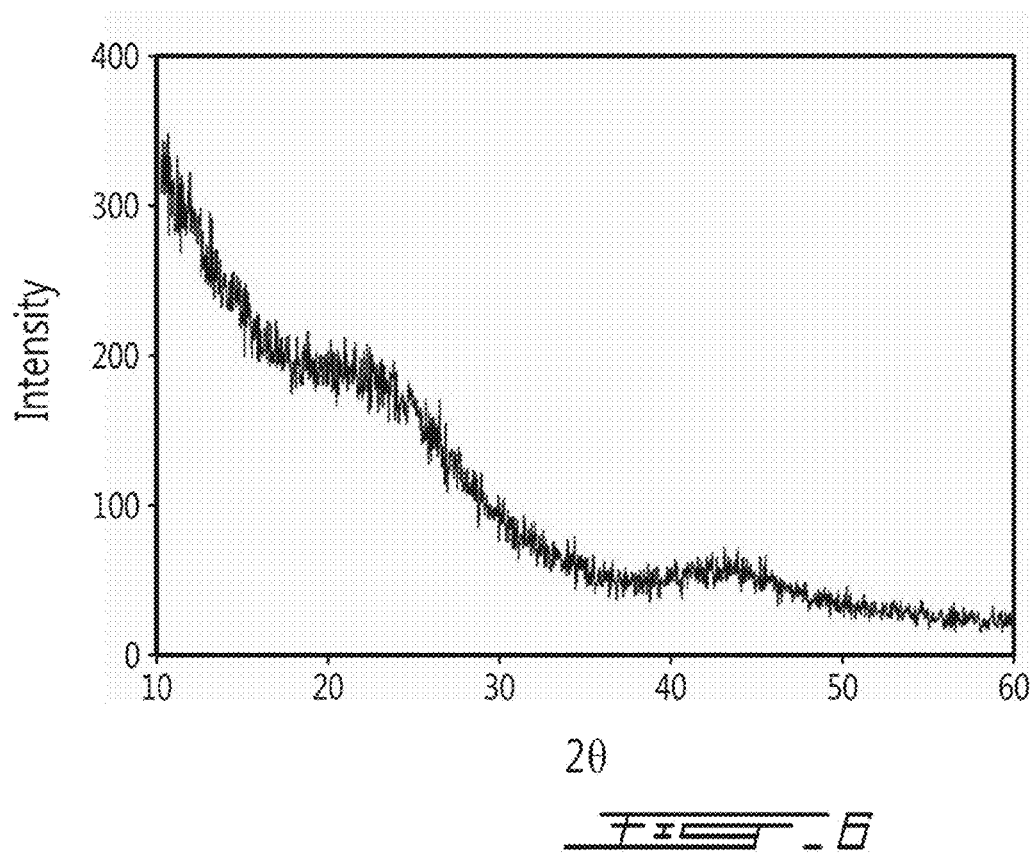
FIG. 6: PXRD of carbon sample from preparation 2.
Figure 7:
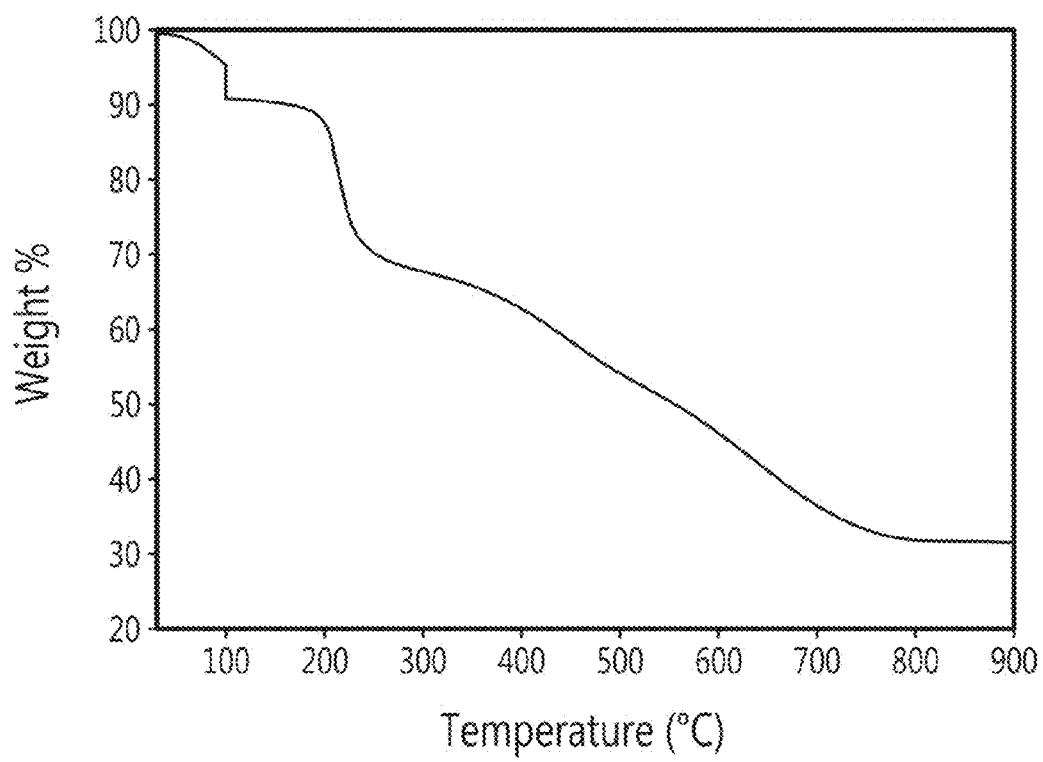
FIG. 7: TGA (air, 20° C./min) of NCC-silica composite sample from preparation 2.
Figure 8:
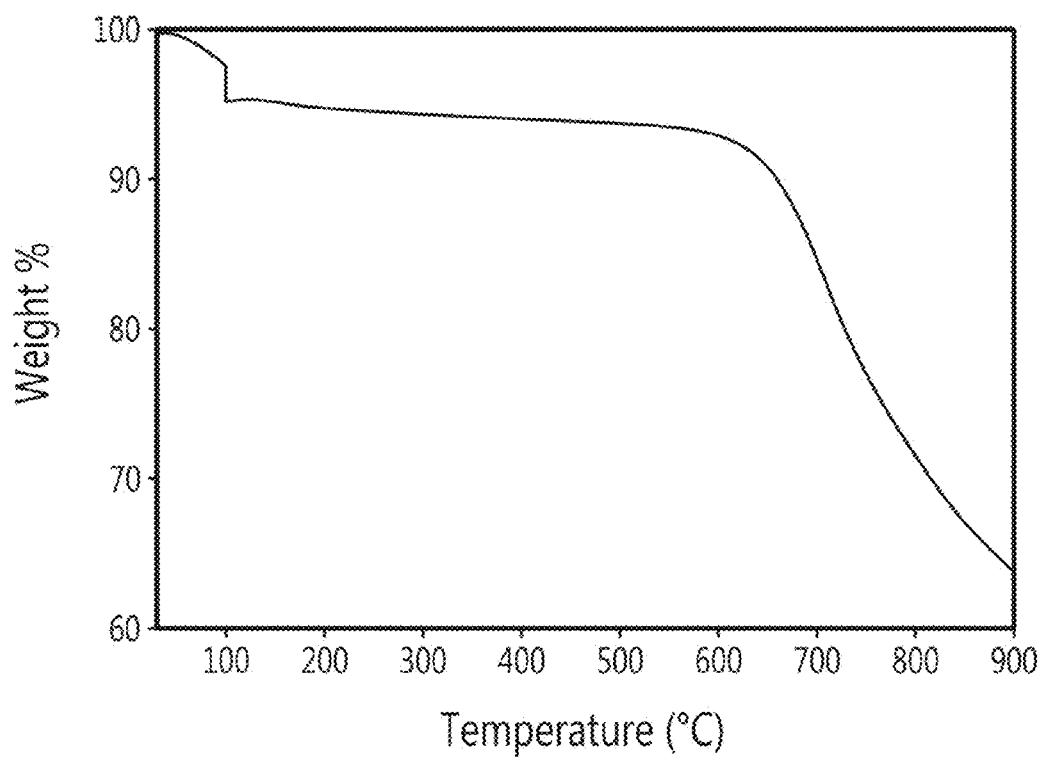
FIG. 8: TGA (air, 20° C./min) of carbon-silica composite sample from preparation 2.
Figure 9:
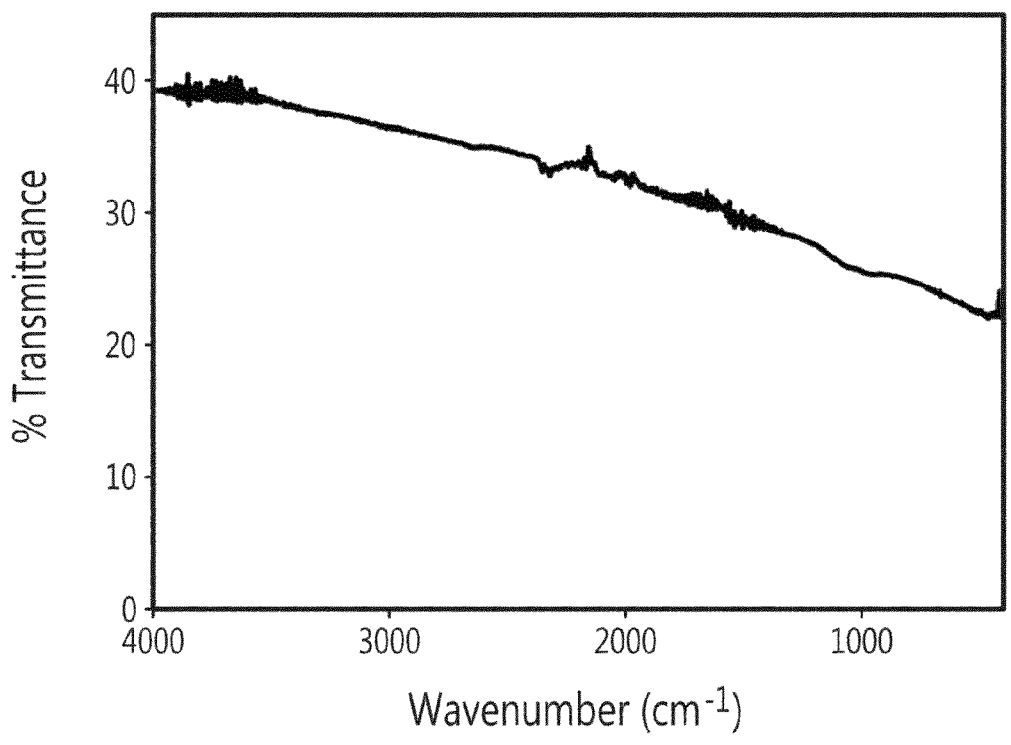
FIG. 9: IR spectrum of carbon sample from preparation 2.

The full synthesis (step (a) of FIG. 2) and characterization of NCC-silica composite films has been described in U.S. patent application Ser. No. 13/076,469 filed Mar. 31, 2011, the contents of which are incorporated herein by reference. The samples described herein were prepared with different ratios of silica precursor to NCC (Preparations 1-3). An additional control sample was prepared from pure NCC (Preparation 5). Carbonization was achieved by pyrolysis of the composite films at 900° C. (with the exception of Preparation 4, which was pyrolyzed at 600° C.) for 6 h under nitrogen. This results in shiny black films that generally still display some iridescence. The films were characterized by infrared (IR) spectroscopy (FIGS. 3-4) and powder X-ray diffraction (PXRD) (FIGS. 5-6) before and after pyrolysis, which clearly demonstrates the conversion of cellulose to amorphous carbon. The carbon yields were determined by thermogravimetric analysis (TGA) before and after carbonization and are found to be as high as 30 wt % for Preparation 2 (FIGS. 7-8). These carbon yields are much higher than the typically reported yields of 10-15 wt % for carbonization of cellulose under $N_2$.[29,30] It has been well-established that the addition of sulfuric acid prior to pyrolysis can increase the carbon yield when cellulose or glucose is used as the carbon precursor.[31,17] The surface of NCC utilized in the invention is already functionalized with sulfate groups and it is believed that this as well as the encapsulation of the NCC in the silica helps to obtain a high yield without the need for a separate sulfuric acid impregnation step. Removal of the silica from the composite materials was achieved by heating the samples to 85-90° C. in a 2M aqueous NaOH solution. After rinsing the films with water and drying, the removal of the silica was confirmed by IR spectroscopy (FIGS. 9-10) and TGA (FIG. 11), which show the loss of the Si—O peak and a residual mass of 3 wt % after heating under air to 900° C.

Figure 10:
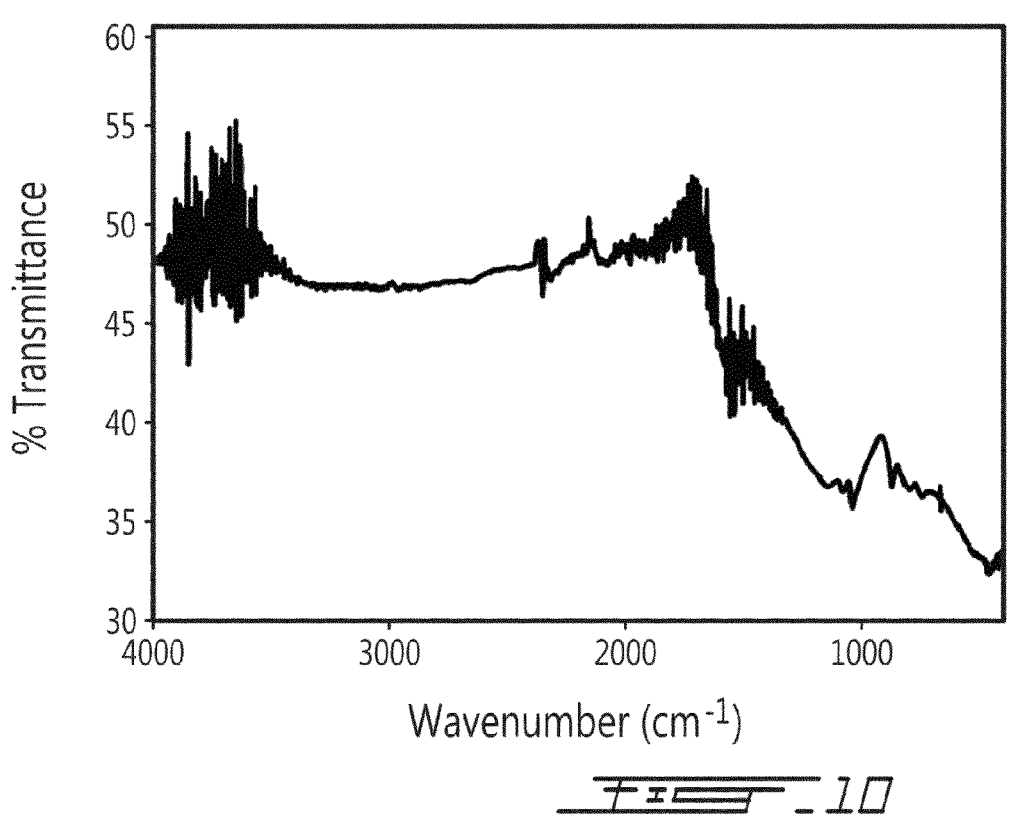
FIG. 10: IR spectrum of carbon sample from preparation 4
Figure 14:
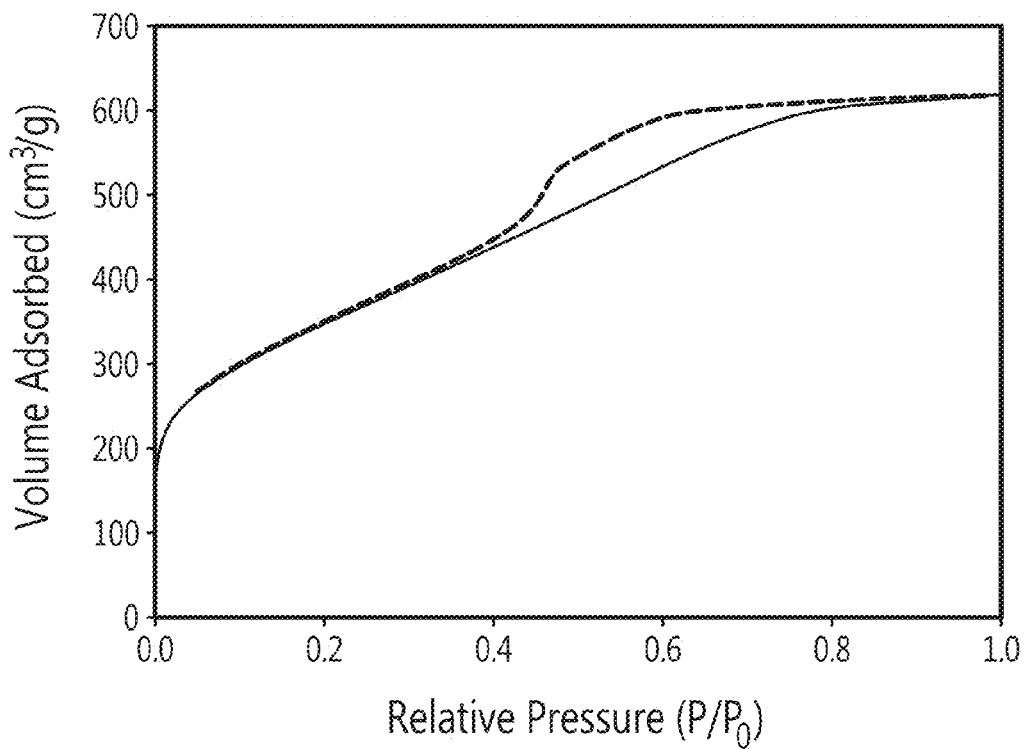
FIG. 14: $N_2$ adsorption/desorption isotherm of carbon sample from preparation 3 in which plots for plots for adsorption and desorption are shown which partially overlap.
Figure 15:
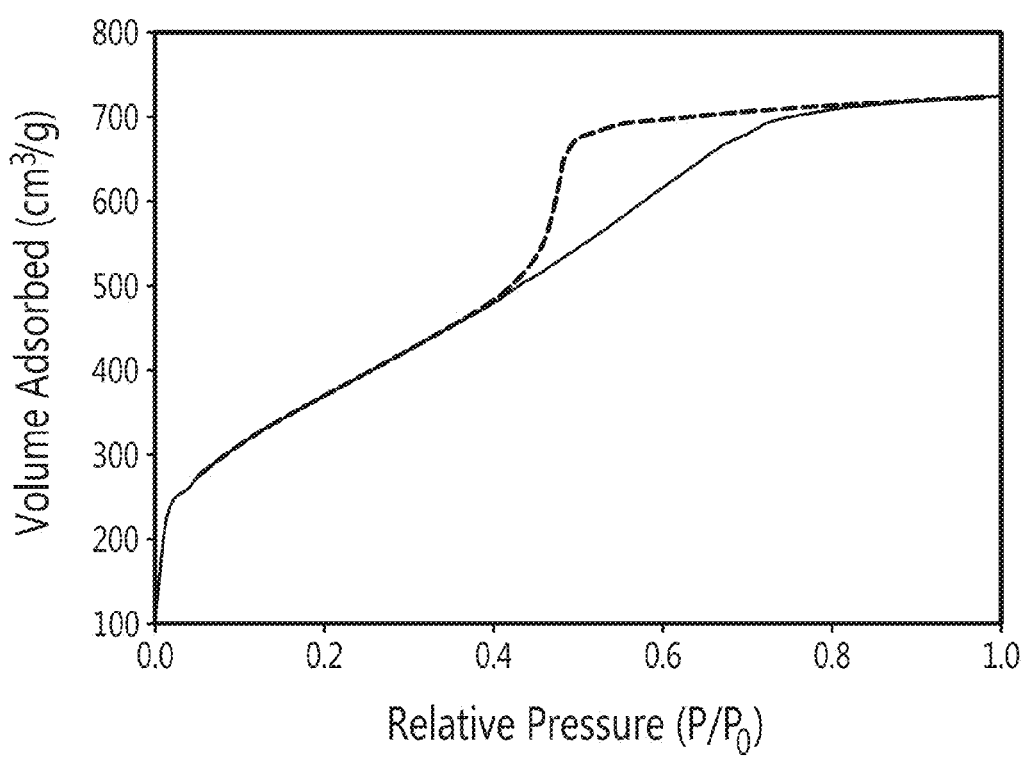
FIG. 15: $N_2$ adsorption/desorption isotherm of carbon sample from preparation 4 in which plots for plots for adsorption and desorption are shown which partially overlap.
Figure 16:
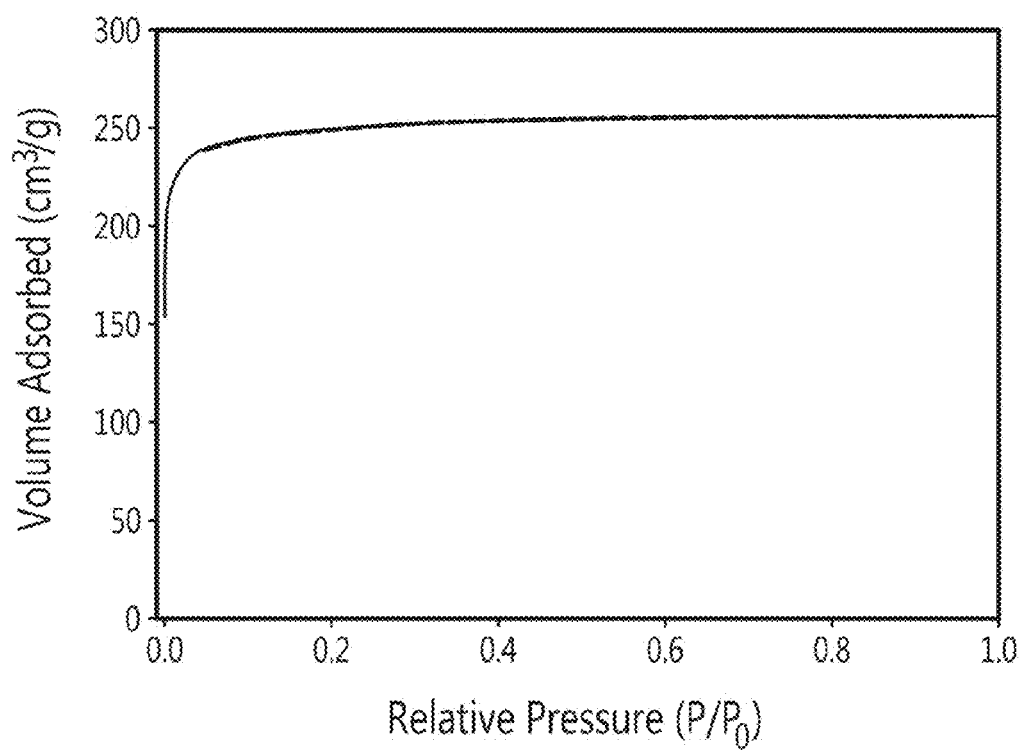
FIG. 16: $N_2$ adsorption/desorption isotherm of carbon sample from preparation 5 in which plots for plots for adsorption and desorption are shown which overlap.
Figure 17:
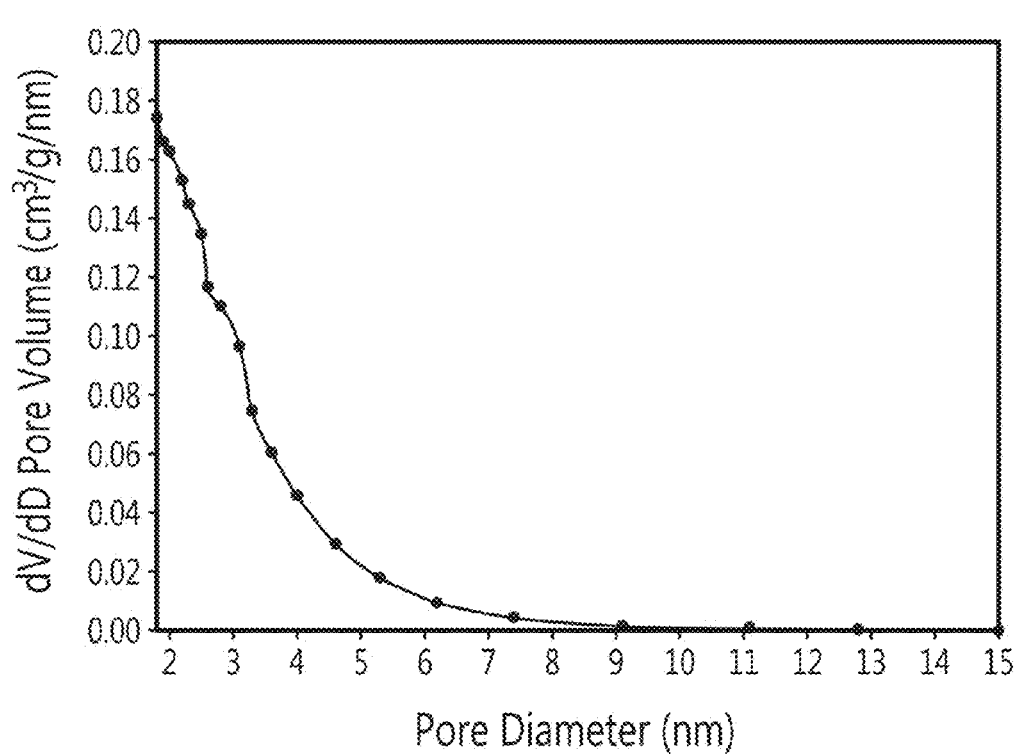
FIG. 17: BJH pore size distribution (adsorption) of carbon sample from preparation 1.

Nitrogen adsorption was used to study the porosity of the different carbon samples. Type IV adsorption isotherms with hysteresis loops, indicative of mesoporous materials, are observed for the carbon obtained using Preparations 1-4 (FIGS. 12-15). The control sample prepared from pure NCC (Preparation 5) gives a type I isotherm indicative of a purely microporous material (FIG. 16). The isotherm shapes, BET surface areas, and pore volumes show a strong dependence on the amount of silica used in the preparation. Preparation 2, which uses an intermediate amount of silica precursor, gives mesoporous carbon with the highest BET surface area (1465 $m^2/g$). In comparison, carbon samples prepared with less silica (Preparation 1) or more silica (Preparation 3) both have smaller BET surface areas (907 $m^2/g$ and 1230 $m^2/g$ respectively). The t-plot analysis of these samples shows a significant micropore contribution to the overall surface area (~10% of the total surface area) whereas Preparation 2 gives a material with essentially no micropore contribution. An additional sample was prepared using the same procedure as Preparation 2 except that pyrolysis was carried out at 600° C. (Preparation 4). The $N_2$ adsorption/desorption isotherms for Preparations 2 and 4 (FIG. 15) are nearly identical showing that mesoporous carbon materials may be obtained by our method using different pyrolysis temperatures. The IR spectrum for mesoporous carbon prepared at 600° C. indicates the presence of some residual functional groups (FIG. 10). This demonstrates that different synthetic temperatures may be useful for fine-tuning the surface properties of the mesoporous carbon.

Figure 18:
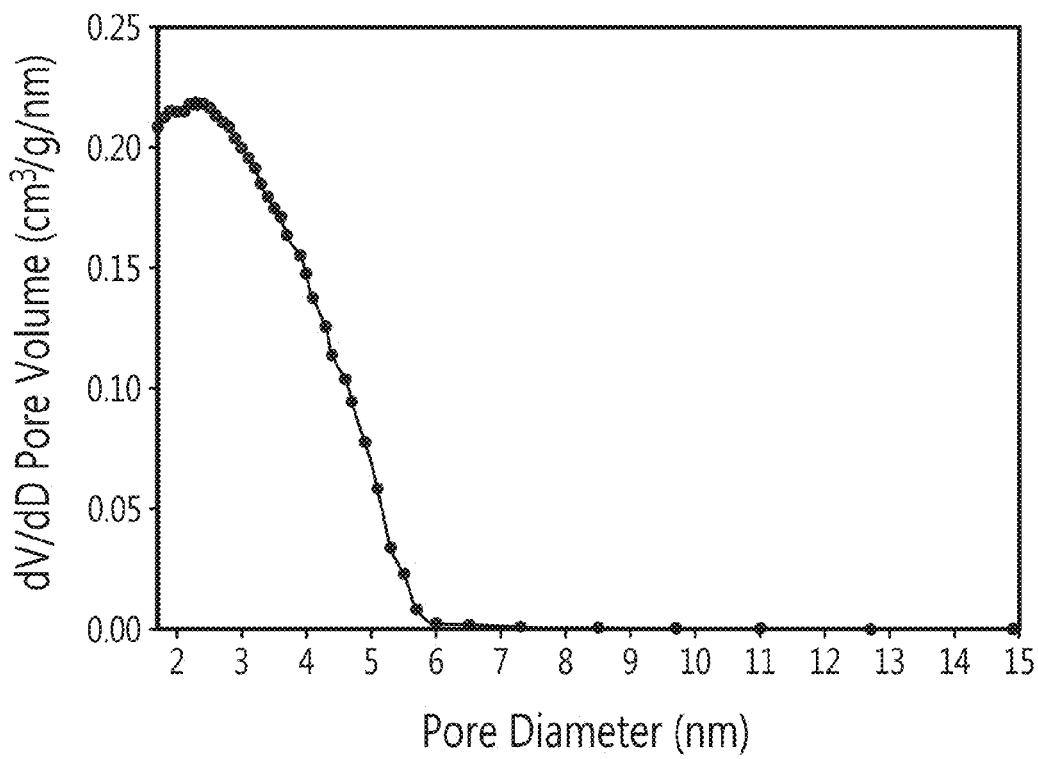
FIG. 18: BJH pore size distribution (adsorption) of carbon sample from preparation 2.
Figure 19:
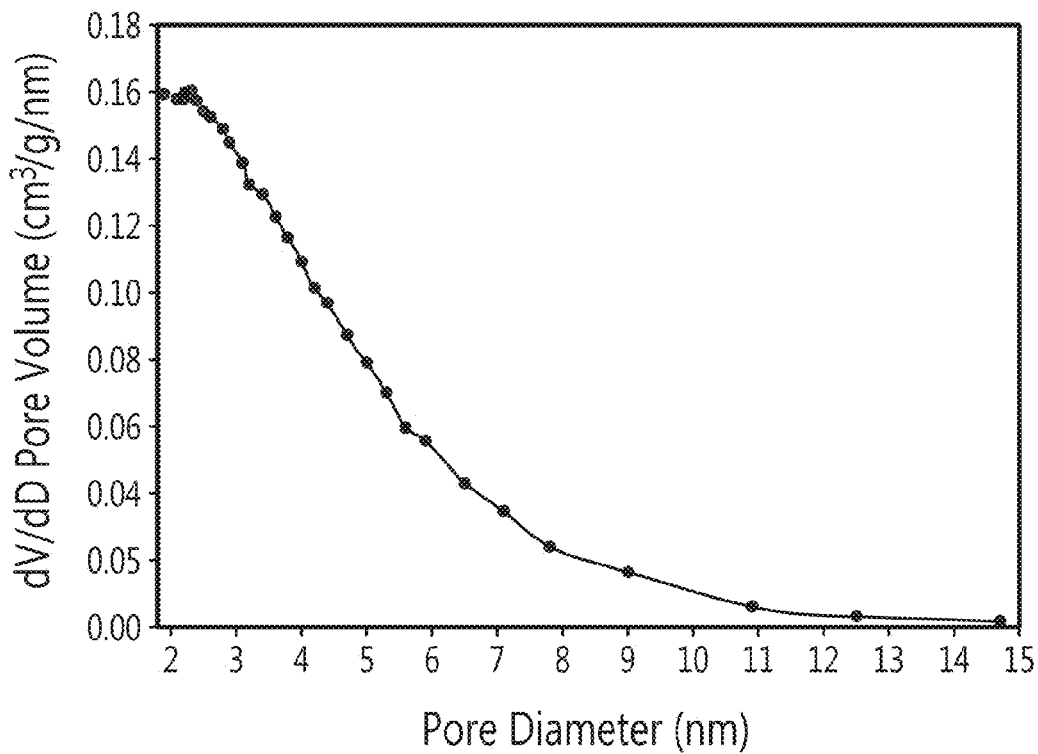
FIG. 19: BJH pore size distribution (adsorption) of carbon sample from preparation 3.
Figure 20:
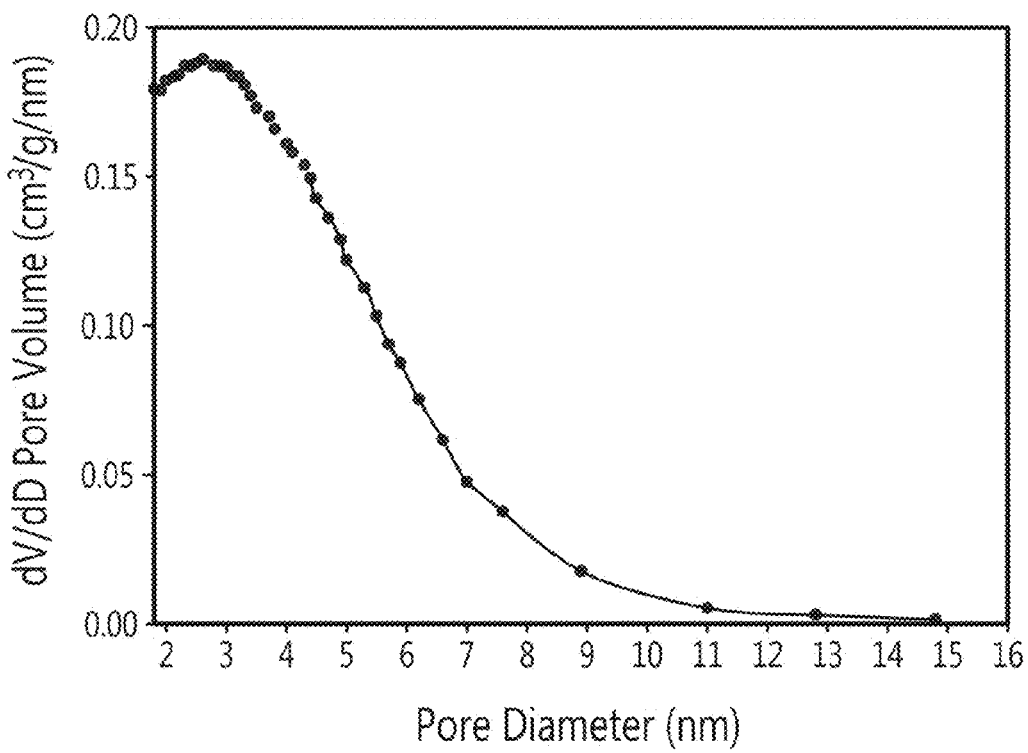
FIG. 20: BJH pore size distribution (adsorption) of carbon sample from preparation 4.
Figure 21:
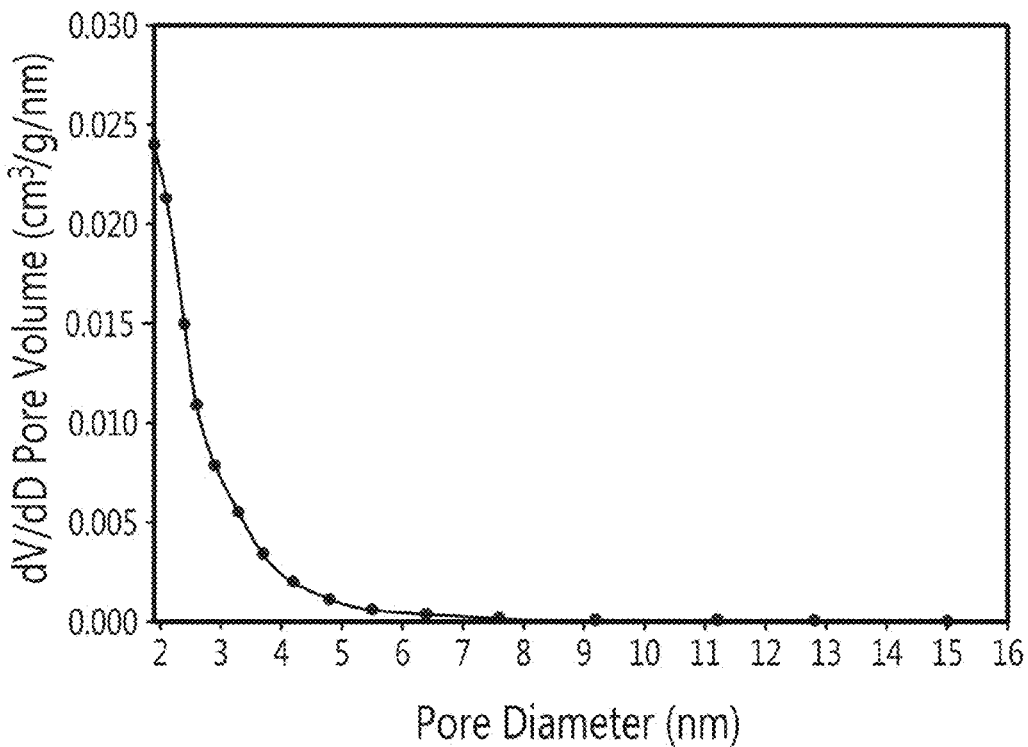
FIG. 21: BJH pore size distribution (adsorption) of carbon sample from preparation 5.

The BJH pore size distributions derived from the adsorption branch of the isotherms for Preparations 1-5 are shown in FIGS. 17-21. The pore size distribution calculated for Preparation 1 shows a sharp rise in pore volume beginning at ~4 nm (FIG. 17) with no peak observed before 2 nm. Carbon prepared from Preparation 2 on the other hand shows a fairly broad peak at 2.8 nm with essentially no pore volume past 6 nm (FIG. 18). Cylindrical mesopores for this sample were also visualized by transmission electron microscopy (TEM, FIG. 22). Preparation 3 yields carbon that has a very broad pore distribution with pore volume beginning around 11 nm and gradually increasing to a plateau at 2.5 nm (FIG. 19). As expected, the microporous carbon from Preparation 5 shows very little pore volume before 2 nm (FIG. 21, note the scale on the y-axis is an order of magnitude smaller than for FIG. 17-20). These results further illustrate the importance of the silica in the preparation of the mesoporous carbon samples. Varying the relative amounts of NCC and silica shows that there is an ideal window for obtaining a mesoporous product; it is clear that an adequate silica wall-thickness is required for mesopore formation. On the other hand, when too much silica is used the pore size distribution is very broad and micropores begin to reappear. By way of example a suitable ratio based on TMOS (tetramethoxysilane) or TEOS (tetraethoxysilane) as the source of the inorganic matrix would be 4-16.5 mmol TMOS or TEOS /g NCC and preferably about 9 mmol TMOS or TEOS /g NCC in terms of max surface area and mesoporosity. We postulate that some carbon bridges are required to form between the silica walls during pyrolysis in order for the structure to be retained after the removal of silica. When the silica walls are too thick, these bridges are formed less effectively. Overall, these results clearly show that mesoporous carbon may be obtained using our new approach. Through a simple variation in the synthesis, namely the relative amounts of silica precursor and NCC that are used, the ratio of mesopores to micropores in the materials may be altered. Further optimization of these conditions within the ideal synthetic window should allow for further fine-tuning of the porosity of the mesoporous carbon materials.

Figure 23:
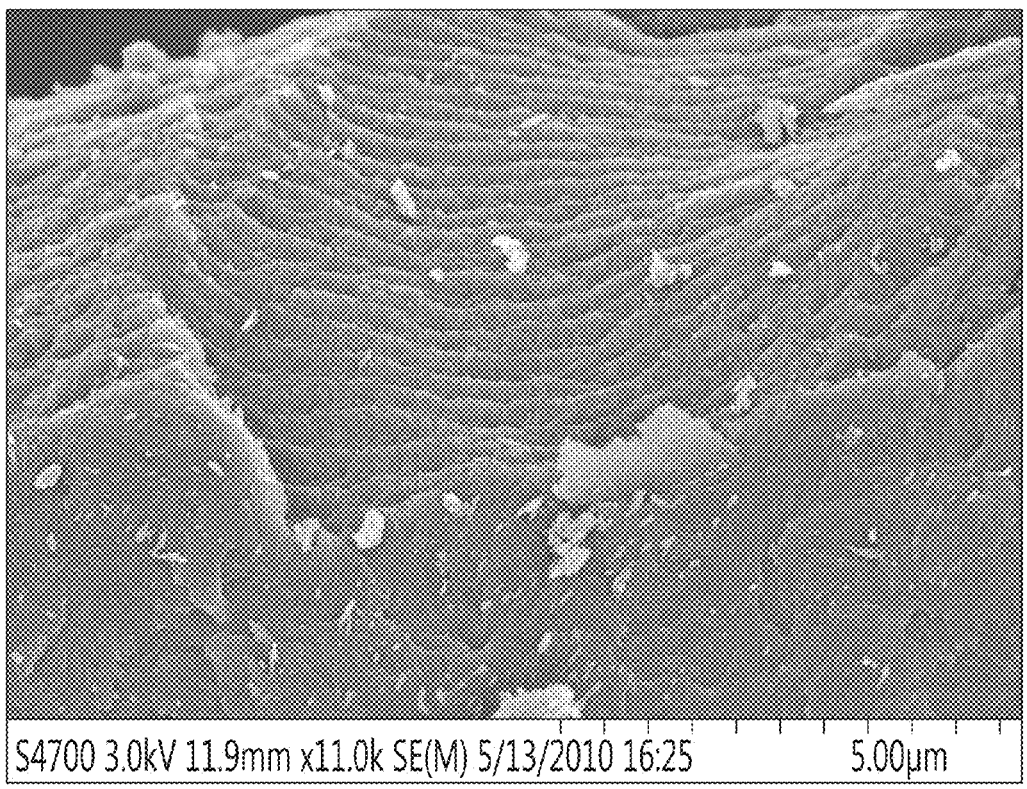
FIG. 23: SEM image of carbon sample from preparation 4.
Figure 24:
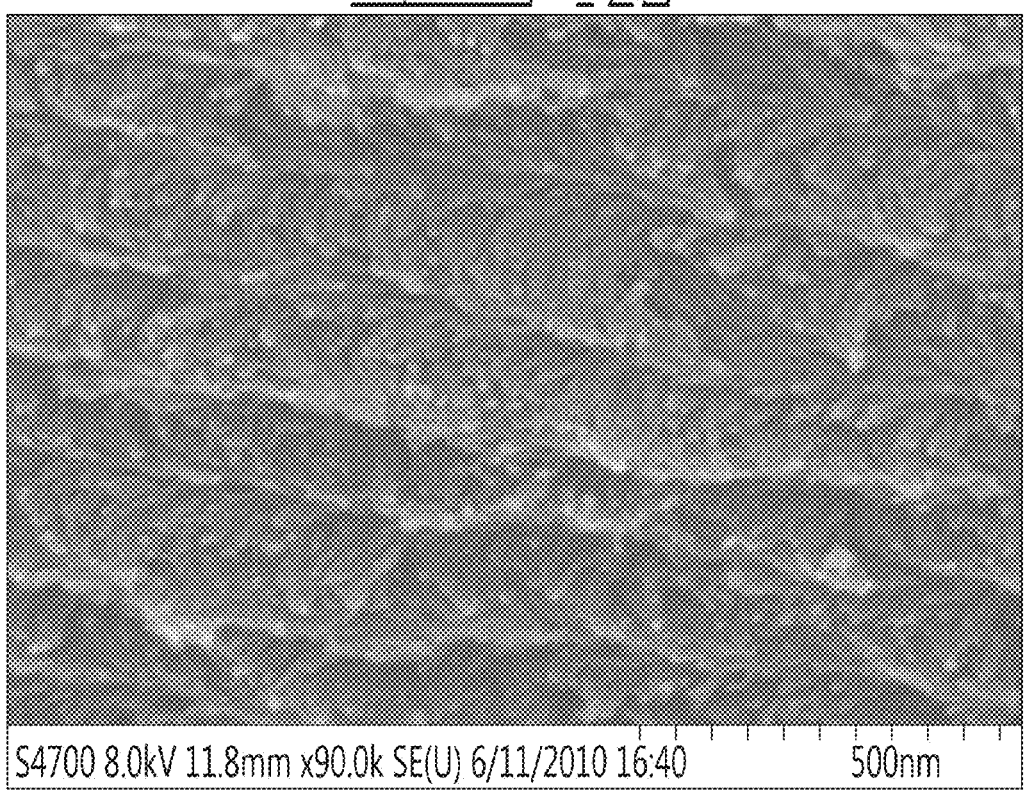
FIG. 24: SEM image of carbon sample from preparation 2.
Figure 25:
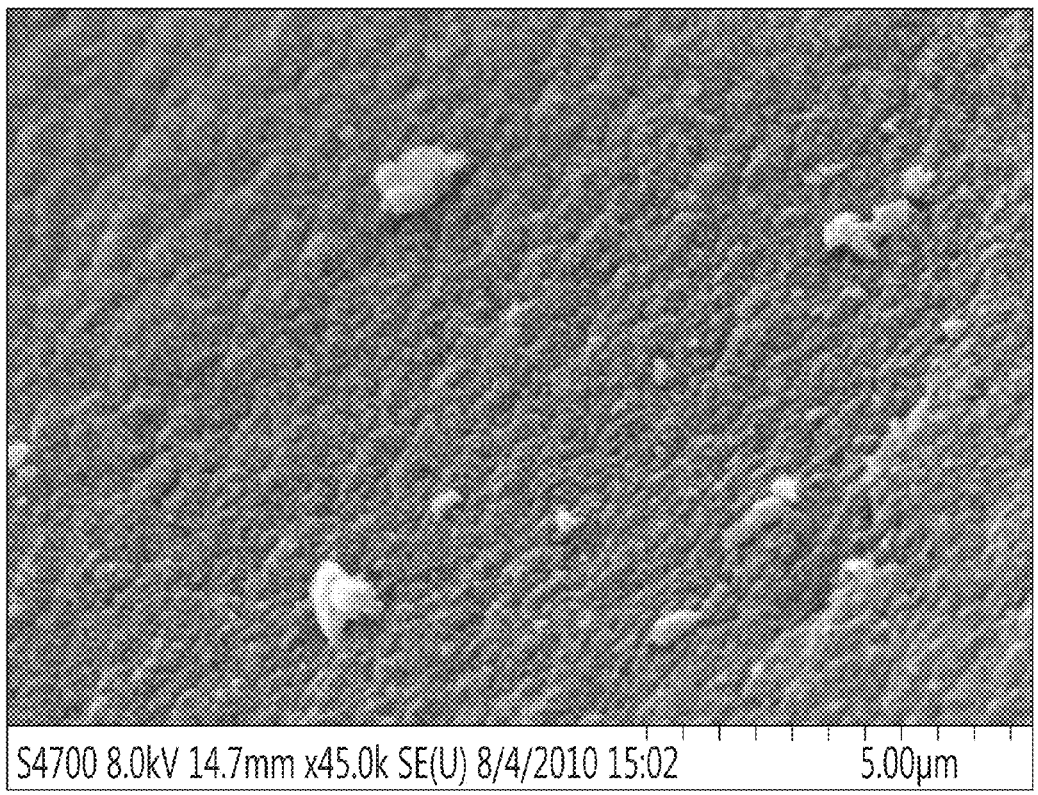
FIG. 25: SEM image of carbon sample from preparation 1.

Scanning electron microscopy (SEM) provides evidence of the replication of chiral nematic organization in the mesoporous carbon films from Preparations 2, 3, and 4. Perpendicular to the surface of the film, a layered structure is observed with a repeating distance of several hundred nanometers that arises from the helical pitch of the chiral nematic phase (FIG. 23). At higher magnification a well-defined twisting rod-like morphology is resolved (FIG. 24). Throughout the entire sample, this twisting appears to occur in a counter-clockwise direction when moving away from the viewer, which corresponds to a left-handed helical organization. Preparations 2-4, which correspond to the most mesoporous samples, also show the best retention of chiral nematic organization. As a comparison, a much less well-defined structure was observed for Preparation 1 (FIG. 25). The control sample (Preparation 5) appears much more disordered (FIG. 26) and generally does not retain the chiral nematic structure of the original NCC films. The silica clearly has a protective effect during pyrolysis that allows for the chiral nematic structure to remain intact in conjunction with the templation of well-defined mesopores.

Figure 27:
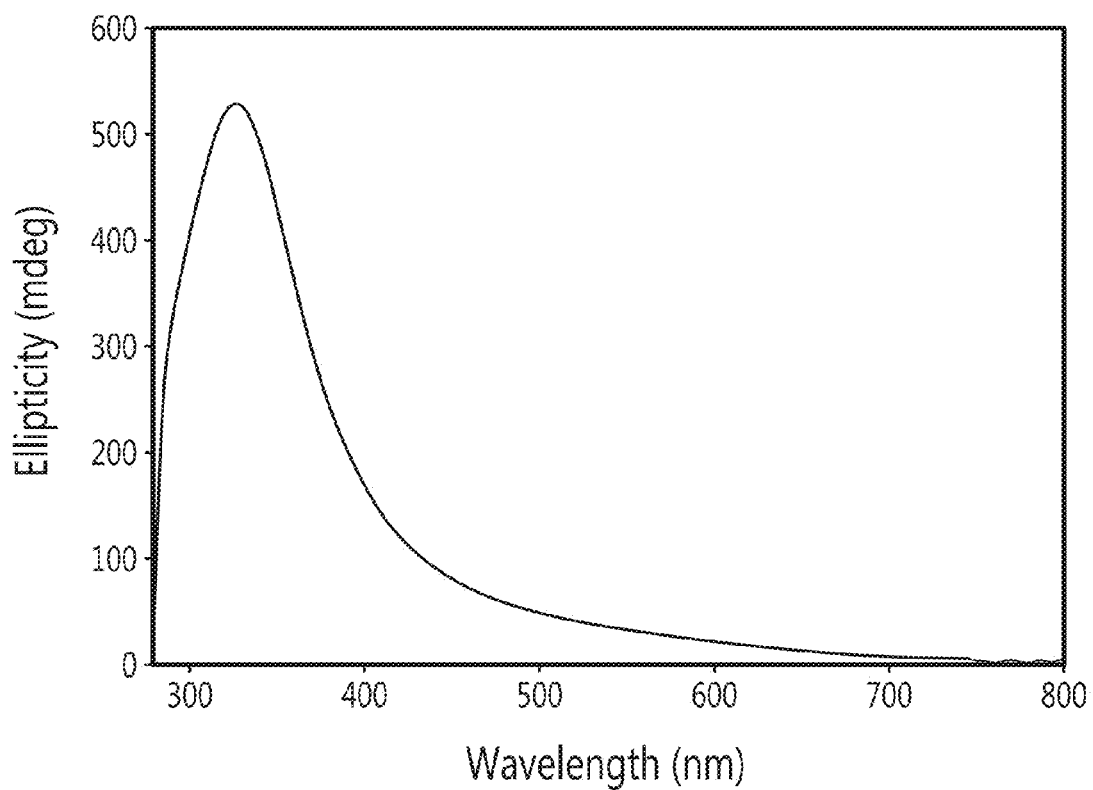
FIG. 27: CD spectrum of silica from preparation 6.

To further confirm the chirality of the mesoporous carbon and demonstrate its utility as a template for other chiral materials, mesoporous carbon from preparation 2 was used to template silica. Repeated loading and condensation of TEOS within the pores of the films followed by removal of the carbon results in transparent silica. The silica is birefringent by polarized optical microscopy (POM) with a texture similar to that observed in pure NCC films with chiral nematic organization. Circular dichroism shows a strong signal with positive ellipticity resulting from chiral reflection at 327 nm (FIG. 27). This experiment further confirms that the carbonaceous material from Preparation 2 has a chiral structure, and that it can be transferred to other materials.

The materials prepared herein always have an organization that shows a positive ellipticity by CD (left-handed organization). The other organization (right-handed) is not known, but if it could be discovered, then this method should be applied to make the enantiomeric structure. While the examples herein are of materials from silica, other inorganic and metal-organic structures (e.g., based on organosilanes) and which maintain their integrity under condition for carbonizing the NCC and which can thereafter be removed, can also be employed.

Mesoporous carbon without chiral nematic organization may also be obtained from NCC by using a procedure identical to Preparation 2 with one modification, that modification being that the pH of the NCC suspension is adjusted to a pH where the chiral nematic ordering is disrupted during the synthesis of the composite (Preparation 7). When the pH of the NCC suspension was adjusted to 2.0, transparent NCC-silica composite films were obtained. The films were determined to be achiral through UV-Vis-NIR spectroscopy, which did not reveal any reflection due to the chiral nematic organization within the range of 300-3000 nm. SEM images also did not reveal any chiral nematic organization within the films but instead indicate that the films possess nematic ordering. POM images further suggest that the organization of NCC within the achiral composite films is most likely nematic. After pyrolysis under $N_2$ and the removal of silica, free-standing carbon films were obtained. $N_2$ adsorption experiments demonstrate that the achiral carbon films are mesoporous with similar adsorption characteristics compared to the mesoporous carbon obtained from Preparation 2. SEM images of the mesoporous carbon do not reveal any chiral nematic organization. Mesoporous carbon may therefore be synthesized from NCC with both chiral and achiral structures.

EXAMPLES

In the Examples, sonication was applied to ensure that the NCC particles were dispersed. The sonicator was a standard laboratory model (2 A, 120 V) available from VWR (Aquasonic model 50T). A sonication time of 10-15 minutes was typically applied prior to addition of the silicon-containing compound.

Preparation 1.

Synthesis of NCC/Silica Composite:

1.00 mL of TEOS is added to 30.0 mL of a freshly sonicated 3.5% aqueous NCC suspension. The mixture is stirred at 60° C. until a homogeneous mixture is obtained (~4 h), indicating complete hydrolysis of the TEOS. The mixture is poured into polystyrene Petri dishes and after slow evaporation at room temperature slightly red films are obtained.

Pyrolysis:

Under flowing nitrogen, 1.00 g of the NCC/silica composite films is heated at a rate of 2° C./min to 100° C. for 2 h, then heated at 2° C./min to 900° C. for 6 h, and finally cooled to room temperature at 4° C./min. After slowly cooling to room temperature 372 mg of free-standing black films are recovered. The IR spectrum of the sample confirms the conversion of NCC to carbon. The mass yield of carbon calculated from TGA is 28.1%.

Figure 12:
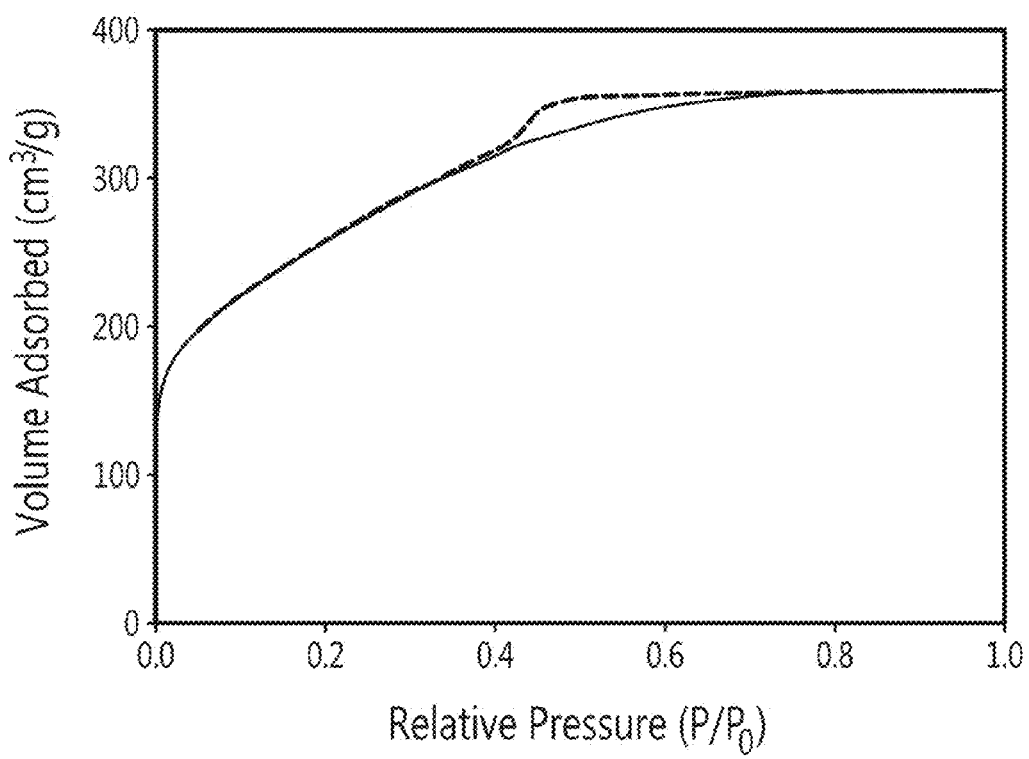
FIG. 12: $N_2$ adsorption/desorption isotherm of carbon sample from preparation 1 in which plots for adsorption and desorption are shown which partially overlap.

Silica Etching:

300 mg of the carbon/silica composite films are placed in a beaker containing 200 mL of 2M aqueous NaOH solution and heated to 90° C. for 4 h. The films are then recovered by filtration and rinsed with copious amounts of water. After air drying 152 mg of carbon films are recovered. The IR spectrum of the sample confirms the removal of silica and TGA gives a 3.8 wt % residue after heating to 900° C. under air. Nitrogen adsorption measurements show a BET surface area of 907 $m^2/g$ (micropore area from t-plot=103 $m^2/g$) and a pore volume of 0.56 $cm^3/g$ (FIG. 12). SEM images reveal that the chiral nematic structure is poorly retained in the carbon product (FIG. 25).

Preparation 2.

Synthesis of NCC/Silica Composite:

1.40 mL of TMOS is added to 30.0 mL of a freshly sonicated 3.5% aqueous NCC suspension. The mixture is stirred at room temperature until a homogeneous mixture is obtained (~1 h), indicating complete hydrolysis of the TMOS. The mixture is poured into polystyrene Petri dishes and after slow evaporation at room temperature colourless films are obtained.

Pyrolysis:

Under flowing nitrogen, 1.00 g of the NCC/silica composite films is heated at a rate of 2° C./min to 100° C. for 2 h, then heated at 2° C./min to 900° C. for 6 h, and finally cooled to room temperature at 4° C./min. After slowly cooling to room temperature 505 mg of free-standing black films are recovered. The IR spectrum of the sample (FIG. 4) and PXRD (FIG. 6) confirms the conversion of NCC to carbon. The mass yield of carbon calculated from TGA is 29.6%

Figure 11:
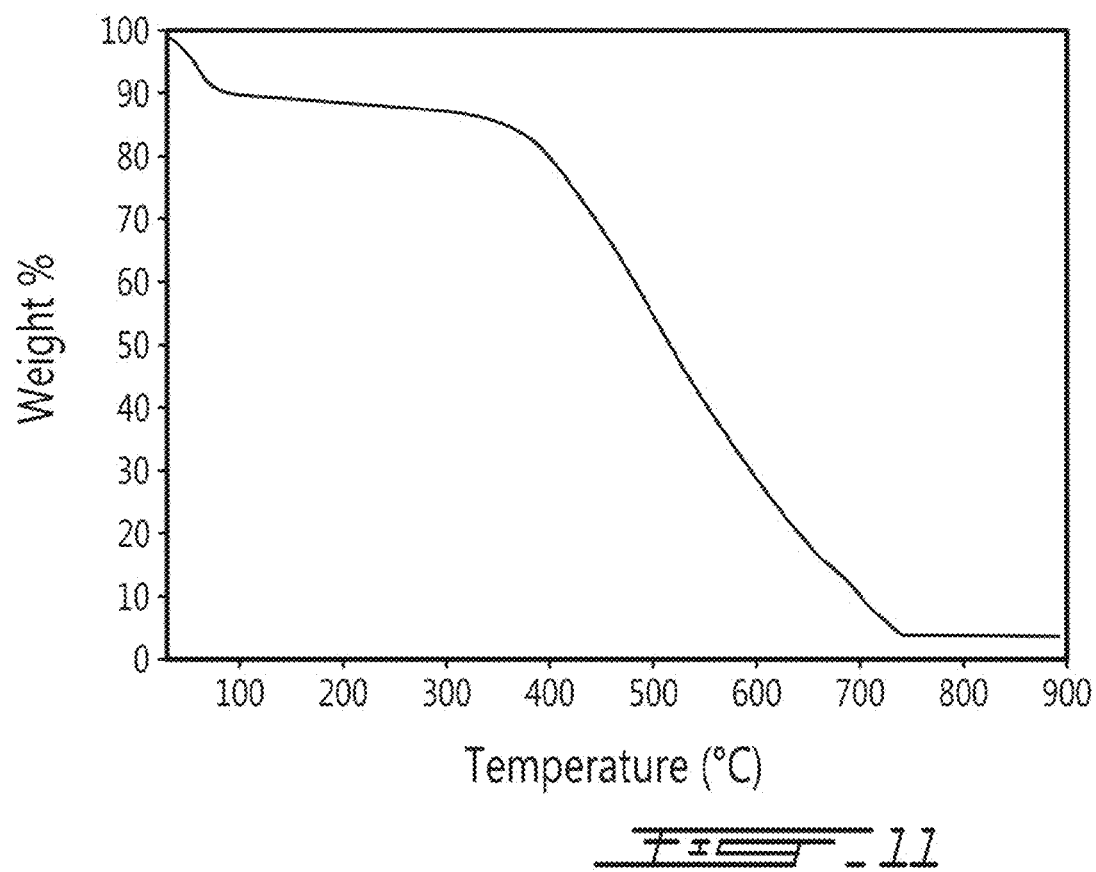
FIG. 11: TGA (air, 20° C./min) of carbon sample from preparation 2.
Figure 13:
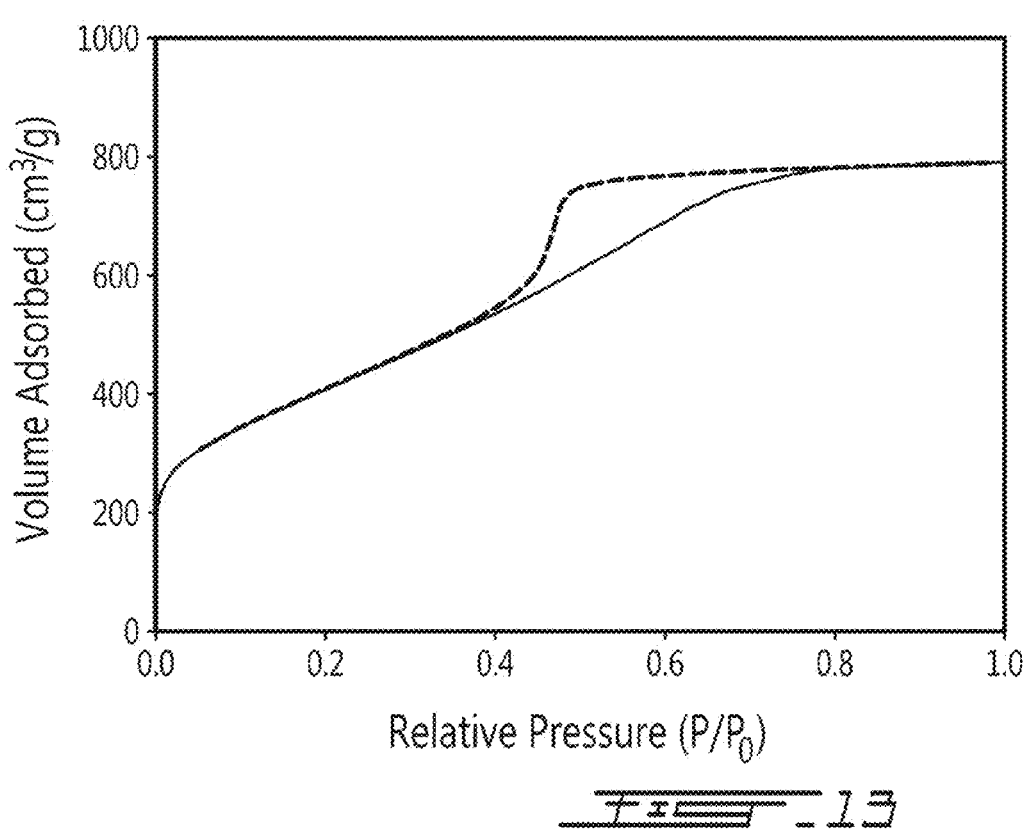
FIG. 13: $N_2$ adsorption/desorption isotherm of carbon sample from preparation 2 in which plots for plots for adsorption and desorption are shown which partially overlap.
Figure 22:
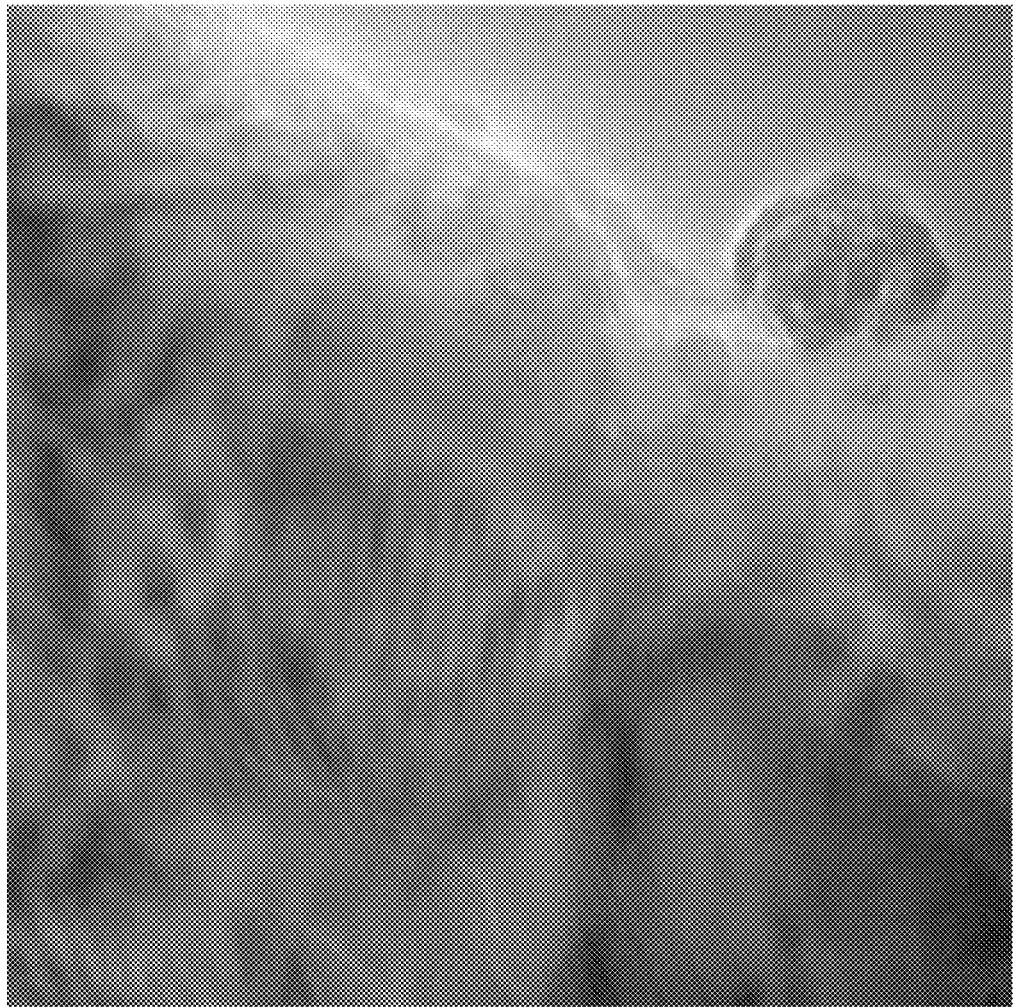
FIG. 22: TEM image of carbon sample from preparation 2.

Silica Etching:

500 mg of the carbon/silica composite films are placed in a beaker containing 200 mL of 2M aqueous NaOH solution and heated to 90° C. for 4 h. The films are then recovered by filtration and rinsed with copious amounts of water. After air drying 175 mg of carbon films are recovered. The IR spectrum of the sample confirms the removal of silica (FIG. 9) and TGA gives a 3.2 wt % residue after heating to 900° C. under air (FIG. 11). Nitrogen adsorption measurements show a BET surface area of 1465 $m^2/g$ (micropore area from t-plot=11 $m^2/g$) and a pore volume of 1.22 $cm^3/g$ (FIG. 13). TEM images show long locally aligned pores (FIG. 22). SEM images reveal a structure consistent with chiral nematic organization (FIG. 24).

Preparation 3.

Synthesis of NCC/Silica Composite:

2.50 mL of TMOS is added to 30.0 mL of a freshly sonicated 3.5% aqueous NCC suspension. The mixture is stirred at room temperature until a homogeneous mixture is obtained (~1 h), indicating complete hydrolysis of the TMOS. The mixture is poured into polystyrene Petri dishes and after slow evaporation at room temperature colorless films are obtained.

Pyrolysis:

Under flowing nitrogen, 1.00 g of the NCC/silica composite films are heated at a rate of 2° C./min to 100° C. for 2 h, then heated at 2° C./min to 900° C. for 6 h, and finally cooled to room temperature at 4° C./min. After slowly cooling to room temperature 490 mg of free-standing black films are recovered. The IR spectrum of the sample confirms the conversion of NCC to carbon. The mass yield of carbon calculated from TGA is 19.1%

Silica Etching:

450 mg of the carbon/silica composite films are placed in a beaker containing 200 mL of 2M aqueous NaOH solution and heated to 90° C. for 4 h. The films are then recovered by filtration and rinsed with copious amounts of water. After air drying 82 mg of carbon films are recovered. The IR spectrum of the sample confirms the removal of silica. Nitrogen adsorption measurements show a BET surface area of 1230 $m^2/g$ (micropore area from t-plot=128 $m^2/g$) and a pore volume of 0.96 $cm^3/g$ (FIG. 14). SEM images reveal a structure consistent with chiral nematic organization.

Preparation 4.

Synthesis of NCC/Silica Composite:

2.00 mL of TMOS is added to 50.0 mL of a freshly sonicated 3.0% aqueous NCC suspension. The mixture is stirred at room temperature until a homogeneous mixture is obtained (~1 h), indicating complete hydrolysis of the TMOS. The mixture is poured into polystyrene Petri dishes and after slow evaporation at room temperature colorless films are obtained.

Pyrolysis:

Under flowing nitrogen, 1.50 g of the NCC/silica composite films are heated at a rate of 2° C./min to 100° C. for 2 h, then heated at 2° C./min to 600° C. for 6 h, and finally cooled to room temperature at 4° C./min. After slowly cooling to room temperature 766 mg of free-standing black films are recovered. The IR spectrum of the sample confirms the conversion of NCC to carbon, although some functional groups still remain due to the lower pyrolysis temperature (FIG. 10). The mass yield of carbon calculated from TGA is 27.9%

Silica Etching:

500 mg of the carbon/silica composite films are placed in a beaker containing 200 mL of 2M aqueous NaOH solution and heated to 90° C. for 4 h. The films are then recovered by filtration and rinsed with copious amounts of water. After air drying 180 mg of carbon films are recovered. The IR spectrum of the sample confirms the removal of silica. Nitrogen adsorption measurements show a BET surface area of 1330 $m^2/g$ (micropore area from t-plot=38 $m^2/g$) and a pore volume of 1.12 $cm^3/g$ (FIG. 15). SEM images reveal a structure consistent with chiral nematic organization (FIG. 23).

Preparation 5.

Figure 26:
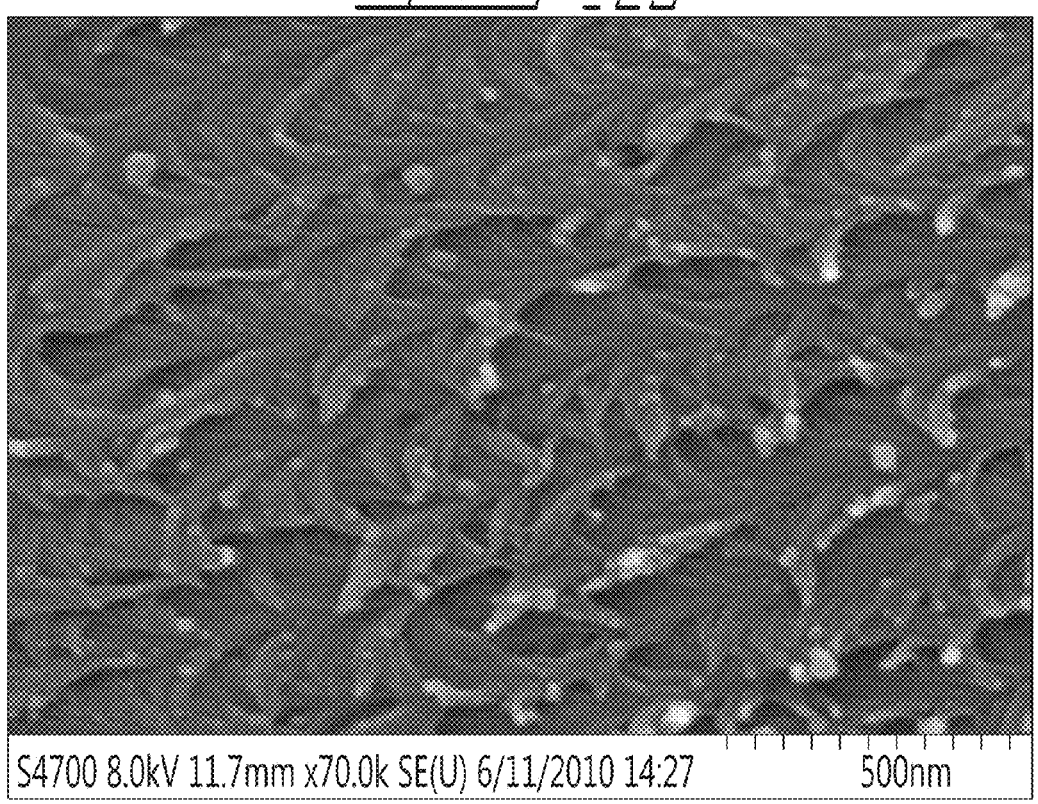
FIG. 26: SEM image of carbon sample from preparation 5.

Synthesis of Control Sample:

NCC films are prepared by slow evaporation at room temperature in polystyrene Petri dishes. Under flowing nitrogen, 1.00 g of the NCC/silica composite films are heated at a rate of 2° C./min to 100° C. for 2 h, then heated at 2° C./min to 900° C. for 6 h, and finally cooled to room temperature at 4° C./min. After slowly cooling to room temperature 205 mg of free-standing black films (mass yield=20.1%) are recovered. The IR spectrum of the sample confirms the conversion of NCC to carbon. Nitrogen adsorption measurements show a BET surface area of 674 $m^2/g$ (micropore area from t-plot=574 $m^2/g$) and a pore volume of 0.40 $cm^3/g$ (FIG. 16). SEM images indicate that the chiral nematic structure of the NCC has been lost during pyrolysis (FIG. 26).

Preparation 6.

Replication of Silica from Mesoporous Carbon:

67 µL of TEOS and 10 µL of 0.1 M HCl solution are mixed together and added dropwise to 52 mg of mesoporous carbon films from preparation 1 in a glass vial. After brief agitation, the vial is placed in an oven at 40° C. for 1 h followed by 80° C. for 1 h. The loading procedure is repeated 10 times.

Pyrolysis:

After the final loading, the films are placed in a tube furnace under flowing $N_2$ and heated at a rate of 2° C./min to 600° C. for 6 h. The pyrolysis is then repeated under flowing air to remove the carbon resulting in transparent silica films (m=65 mg). Circular dichroism of the silica films showed a chiral reflection peak at 327 nm (FIG. 27).

Preparation 7.

Synthesis of Achiral NCC/Silica Composite:

The pH of a 3.5 wt. % NCC suspension is adjusted to pH 2.0 through the dropwise addition of 1 M hydrochloric acid. 1.40 mL of TMOS is added to 30.0 mL of a freshly sonicated 3.5% aqueous NCC suspension at pH 2.0. The mixture is stirred at room temperature until a homogeneous mixture is obtained (~1 h), indicating complete hydrolysis of the TMOS. The mixture is poured into polystyrene Petri dishes and after slow evaporation at room temperature colourless films are obtained.

Pyrolysis:

Under flowing nitrogen, 1.28 g of the NCC/silica composite films is heated at a rate of 2° C./min to 100° C. for 2 h, then heated at 2° C./min to 900° C. for 6 h, and finally cooled to room temperature at 4° C./min. After slowly cooling to room temperature 557 mg of free-standing black films are recovered. The IR spectrum of the sample and PXRD confirms the conversion of NCC to carbon.

Silica Etching:

500 mg of the carbon/silica composite films are placed in a beaker containing 200 mL of 2M aqueous NaOH solution and heated to 90° C. for 4 h. The films are then recovered by filtration and rinsed with copious amounts of water. After air drying 160 mg of carbon films are recovered. The IR spectrum of the sample confirms the removal of silica. Nitrogen adsorption measurements show a BET surface area of 1224 $m^2/g$ (micropore area from t-plot=74 $m^2/g$) and a pore volume of 1.03 $cm^3/g$ (FIG. 13). SEM images reveal the absence of chiral nematic organization in the mesoporous carbon.

REFERENCES A

1. Liang, C., Li, Z., Dai, S. Mesoporous carbon materials: synthesis and modification. *Angew. Chem. Int. Ed.* 47, 3696-3717 (2008).
2. Bansal, R. C., Donnet, J. B., Stoeckli, F. *Active Carbon*, Marcel Dekker, New York (1988).
3. Han, S. J., Sohn, K., & Hyeon, T. Fabrication of new nanoporous carbons through silica templates and their application to the adsorption of bulky dyes. *Chem. Mater.* 12, 3337-3341 (2000).
4. Lee, J., Yoon, S., Hyeon, T., Oh, S. M., & Kim, K. B. Synthesis of a new mesoporous carbon and its application to electrochemical double-layer capacitors. *Chem. Commun.* 2177-2178 (1999).
5. Ji, X. Herle, S. Rho, Y., & Nazar, L. F. Carbon/$MoO_2$ composite based on porous semi-graphitized nanorod assemblies from in situ reaction of tri-block polymers. *Chem. Mater.* 19, 374-383 (2007).
6. Fernandez, J. A., Morishita, T., Toyoda, M., Inasaki, M., Stoeckli, F., & Centeno, T. A. Performance of mesoporous carbons derived from poly(vinyl alcohol) in electrochemical capacitors. *J. Pow. Sour.* 175, 675-679 (2008).
7. Kanatzidis, M. G. Beyond silica: nonoxidic mesostructured materials. *Adv. Mater.* 19, 1165-1181 (2007).
8. Kresge, C. T., Leonowicz, M. E., Roth, W. J., Vartuli, J. C. & Beck, J. S. Ordered mesoporous molecular sieves synthesized by a liquid-crystal template mechanism. *Nature* 359, 710-712 (1992).
9. Yang, P., Zhao, D., Margolese, D. I., Chmelka, B. F. & Stucky, G. D. Generalized syntheses of large-pore meosporous metal oxides with nanocrystalline walls. *Nature* 396, 152-154 (1998).
10. Armatas, G. A. & Kanatzidis, M. G. Hexagonal mesoporous germanium. *Science* 313, 817-820 (2006).
11. MacLachlan, M. J., Coombs, N. & Ozin, G. A. Non-aqueous supramolecular assembly of metal germanium sulfide mesostructures from $[Ge_4S_{10}]^{4-}$ clusters. *Nature* 397, 681-684 (1999).
12. Inagaki, S., Guan, S., Ohsuna, T., Terasaki, O. An ordered mesoporous organosilica hybrid material with a crystal-like wall structure. *Nature* 416, 304-307 (2002).
13. Sun, D., Riley, A. E., Cadby, A. J., Richman, E. K., Korlann, S. D. & Tolbert, S. H. Hexagonal nanoporous germanium through surfactant-driven self-assembly of Zintl clusters. *Nature* 441, 1126-1130 (2006).
14. Attard, G. S., Glyde, J. C. & Goltner, C. G. Liquid-crystalline phases as templates for the synthesis of mesoporous silica. *Nature* 378, 366-368 (1995).
15. Beck, J. S. et al. U.S. Pat. No. 5,108,725 (1992).
16. Beck, J. S. et al. WO Patent 91/11390 (1991).
17. Ryoo, R., Joo, S. H., & Jun, S. Synthesis of highly ordered carbon molecular sieves via template-mediated structural transformation. *J. Phys. Chem. B* 103, 7743-7746 (1999).
18. Jun, S., Joo, S. H., Ryoo, R., Kruk, M., Jaroniec, M., Liu, Z., Ohsuna, T., & Terasaki, O. Synthesis of new, nanoporous carbon with hexagonally ordered mesostructure. *J. Am. Chem. Soc.* 122, 10712-10713 (2000).
19. Kaneda, M., Tsubakiyama, T., Carlsson, A., Sakamoto, Y., Ohsuna, T., Terasaki, O., Joo, S. H., & Ryoo, R. Structural study of mesoporous MCM-48 and carbon networks synthesized in the spaces of MCM-48 by electron crystallography. *J. Phys. Chem. B* 106, 1256-1266 (2002).
20. Vix-Guterl, C., Boulard, S., Parmentier, J., Werckmann, J., & Patarin, J. Formation of ordered mesoporous carbon material from a silica template by a one-step chemical vapour infiltration process. *Chem. Lett.* 1062-1063 (2002).
21. Mukherjee, S. M. & Woods, H. J. X-ray and electron microscope studies of the degradation of cellulose by sulphuric acid. *Biochim. Biophys. Acta* 10, 499-511 (1953).
22. Revol, J. F., Bradford, H., Giasson, J., Marchessault, R. H. & Gray, D. G. Helicoidal self-ordering of cellulose microfibrils in aqueous suspension. *Int. J. Biol. Macromol.* 14, 170-172 (1992).
23. Revol, J. F., Godbout, L. & Gray, D. G. Solid self-assembled films of cellulose with chiral nematic order and optically variable properties. *J. Pulp Pap. Sci.* 24, 146-149 (1998).
24. Broer, D. J., Lub, J. & Mol, G. N. Wide-band reflective polarizers from cholesteric polymer networks with a pitch gradient. *Nature* 378, 467-469 (1995).
25. Yang, D.-K., West, J. L., Chien, L.-C. & Doane, J. W. Control of reflectivity and bistability in displays using cholesteric liquid crystals. *J. Appl. Phys.* 76, 1331-1333 (1994).
26. Kopp, V. I., Fan, B., Vithana, H. K. M. & Genack, A. Z. Low-threshold lasing at the edge of a photonic stop band in cholesteric liquid crystals. *Opt. Lett.* 23, 1707-1709 (1998).
27. MacLachlan, M. J. et al., Inorganic Mesoporous Materials with Chiral Nematic Structures and Preparation Method Thereof, U.S. patent application Ser. No. 13/076, 469 filed Mar. 31, 2011.

28. Shopsowitz, K. E., Qi, H., Hamad, W. Y. & MacLachlan, M. J. Free-Standing Mesoporous Silica Films with Tunable Chiral Nematic Structures. *Nature* 468, 422-425 (2010).
29. Ishida, O., Kim, D. Y., Kuga, S., Nishiyama, Y., & Brown, R. M. Microfibrillar carbon from native cellulose. *Cellulose* 11, 475-480 (2004).
30. Essig, M., Richards, G. N., & Schenck, E. Mechanism of formation of the major volatile products from the pyrolysis of cellulose. *Cellulose and Wood—Chemistry and Technology*. Wiley Interscience, New York, 841-862 (1989).
31. Kim, D. Y., Nishiyama, Y., Wada, M., & Kuga, S. High-yield carbonization of cellulose by sulfuric acid impregnation. *Cellulose* 8, 29-33 (2001).

The invention claimed is:

1. A process for producing a mesoporous carbon material comprising:
   i) carbonising nanocrystalline cellulose (NCC) in an inorganic matrix, and
   ii) removing the inorganic matrix from the carbonised NCC.

2. A process according to claim 1, wherein said carbonising comprises pyrolysis of the NCC under an inert atmosphere at an elevated temperature.

3. A process according to claim 2, wherein said inert atmosphere is nitrogen and said elevated temperature is 500° C. to 2000° C.

4. A process according to claim 3, wherein said inorganic matrix is silica and ii) comprises heating in an aqueous alkali.

5. A process according to claim 4, wherein said alkali is sodium hydroxide and said heating is at 20° C. to 100° C.

6. A process according to claim 5, wherein said NCC in the inorganic matrix comprises said NCC in a chiral nematic arrangement and i) and ii) are carried out with maintenance of the chiral nematic arrangement of the NCC in the carbonised NCC.

7. A process according to claim 6, further comprising: iii) recovering said carbonised NCC as a powder.

8. A process according to claim 4, wherein said NCC in the inorganic matrix comprises said NCC in a chiral nematic arrangement and i) and ii) are carried out with maintenance of the chiral nematic arrangement of the NCC in the carbonised NCC.

9. A process according to claim 8, further comprising: iii) recovering said carbonised NCC as a film.

10. A process according to claim 1, wherein said inorganic matrix is silica and ii) comprises heating in an aqueous alkali.

11. A process according to claim 10, wherein said alkali is sodium hydroxide and said heating is at 20° C. to 100° C.

12. A process according to claim 1, wherein said NCC in the inorganic matrix comprises said NCC in a chiral nematic arrangement and i) and ii) are carried out with maintenance of the chiral nematic arrangement of the NCC in the carbonised NCC.

13. A process according to claim 1, further comprising: iii) recovering said carbonised NCC as a film.

14. A process according to claim 1, further comprising: iii) recovering said carbonised NCC as a powder.

* * * * *